US010305198B2

(12) United States Patent
Schleef et al.

(10) Patent No.: US 10,305,198 B2
(45) Date of Patent: May 28, 2019

(54) FACILITATING WIRELESS COMMUNICATIONS VIA WIRELESS COMMUNICATION ASSEMBLY APPARATUSES

(71) Applicant: AT&T Intellectual Property I, L.P., Atlanta, GA (US)

(72) Inventors: Thomas Schleef, Richardson, TX (US); Craig Lee, Frisco, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 550 days.

(21) Appl. No.: 14/630,709

(22) Filed: Feb. 25, 2015

(65) Prior Publication Data

US 2016/0248603 A1 Aug. 25, 2016

(51) Int. Cl.
*H04L 12/66* (2006.01)
*H01Q 21/00* (2006.01)
*H01Q 1/00* (2006.01)

(52) U.S. Cl.
CPC ......... *H01Q 21/0037* (2013.01); *H01Q 1/007* (2013.01)

(58) Field of Classification Search
CPC ...... H01Q 21/0037; H01Q 1/007; H01Q 1/24; H04L 12/66

(Continued)

(56) References Cited

U.S. PATENT DOCUMENTS 6,421,027 B1 7/2002 Takatori et al.
6,714,168 B2 3/2004 Berenbaum (Continued)

FOREIGN PATENT DOCUMENTS

AU 2003203591 A1 3/2004
EP 298161 A1 1/1989

(Continued)

OTHER PUBLICATIONS

Wolfgang, Basic Antenna Theory, Jan. 1992, IEEE Proceedings of the IEEE, vol. 80, No. 1.*

(Continued)

*Primary Examiner* — Hoang V Nguyen
*Assistant Examiner* — Jae K Kim
(74) *Attorney, Agent, or Firm* — Amin, Turocy & Watson, LLP

(57) ABSTRACT

Wireless communication is facilitated via communication assembly apparatuses. A system includes: a wireless gateway device located within a housing and having electrical connection elements for power and network connectivity; and an antenna coupled to the housing and electrically coupled to the wireless gateway device. The housing is adapted to be masked on a surface of a support structure exposed to a defined environment, and is configured to serve a first function and the support structure is configured to serve a second function. The first function is distinct from the second function. In various embodiments, the antenna can be a resonant slot antenna, a horn antenna, a dipole antenna, a patch antenna or a custom antenna element. The wireless gateway device can include circuitry that facilitates multiple-input and multiple-output communication of the antenna, and is configured to be powered via power over Ethernet in some embodiments. In various embodiments, the support structure can include, but is not limited to, a hand rail, a stage scaffold, a lamp post and/or a trash can.

20 Claims, 24 Drawing Sheets

(58) Field of Classification Search
USPC .......................................................... 343/702
See application file for complete search history.

(56) References Cited

U.S. PATENT DOCUMENTS

| | | | | |
|---|---|---|---|---|
| 6,801,753 | B1 | 10/2004 | Keong | |
| 6,871,081 | B1 | 3/2005 | Llewellyn et al. | |
| 7,082,320 | B2 | 7/2006 | Kattukaran et al. | |
| 7,153,263 | B2 | 12/2006 | Carter et al. | |
| 7,432,858 | B2 | 10/2008 | Arndt et al. | |
| 8,040,289 | B2 | 10/2011 | Kitchener et al. | |
| 8,446,335 | B2 | 5/2013 | Frank | |
| 8,581,794 | B1 * | 11/2013 | Shor | H01Q 9/0421 343/772 |
| 8,655,516 | B2 | 2/2014 | Noffsinger et al. | |
| 8,727,095 | B2 | 5/2014 | Trojer et al. | |
| 8,836,590 | B2 | 9/2014 | Marten et al. | |
| 8,897,695 | B2 | 11/2014 | Becker | |
| 2002/0080087 | A1 * | 6/2002 | Takatori | H01Q 1/007 343/893 |
| 2005/0073465 | A1 * | 4/2005 | Olson | H01Q 1/38 343/795 |
| 2005/0259598 | A1 | 11/2005 | Griffin et al. | |
| 2006/0052099 | A1 * | 3/2006 | Parker | H04L 65/1033 455/426.1 |
| 2007/0004363 | A1 | 1/2007 | Kusaka et al. | |
| 2007/0273599 | A1 * | 11/2007 | Haziza | H01Q 3/22 343/772 |
| 2008/0316087 | A1 * | 12/2008 | Stoufer | H04B 17/0085 342/169 |
| 2010/0231469 | A1 * | 9/2010 | Kim | H01Q 1/246 343/721 |
| 2013/0095875 | A1 | 4/2013 | Reuven | |
| 2013/0346054 | A1 | 12/2013 | Mumtaz | |
| 2014/0073198 | A1 * | 3/2014 | Moffitt | H01R 24/00 439/676 |
| 2014/0097990 | A1 * | 4/2014 | Aboush | H01Q 9/0435 343/700 MS |
| 2014/0113671 | A1 * | 4/2014 | Schwengler | H04W 16/00 455/517 |
| 2014/0133949 | A1 * | 5/2014 | Nishimura | E02F 9/0858 414/744.2 |
| 2014/0218258 | A1 | 8/2014 | Walker | |
| 2014/0313093 | A1 * | 10/2014 | Smith | H01Q 21/24 343/795 |
| 2015/0181645 | A1 * | 6/2015 | Anderson | H01Q 1/22 361/814 |
| 2015/0349421 | A1 * | 12/2015 | Sharawi | H01Q 3/40 342/373 |

FOREIGN PATENT DOCUMENTS

| | | | |
|---|---|---|---|
| EP | 630070 | A1 | 5/1994 |
| EP | 1422957 | A1 | 5/2004 |
| EP | 869625 | B1 | 5/2007 |
| EP | 2635100 | A1 | 9/2013 |

OTHER PUBLICATIONS

Uma, "Options for Improving In-Building Mobile Coverage," Real Wireless, Apr. 18, 2013, pp. 127-139, Version 1.2, Real Wireless Ltd., United Kingdom.

Fung, et al., "Design Template and Measurements for Antenna Planning in an Indoor Radio Environment at 1800 MHz," International Journal of Wireless Information Networks, Apr. 2004, 6 Pages, vol. 11, Issue No. 2, Kluwer Academic Publishers-Plenum Publishers.

Liu, et al., "Mobile Commerce Integrated with Locating Technology in a Shopping Mall," 2012, pp. 186-191, vol. 14.

Bar, et al., "Municipal Wi-Fi networks: The Goals, Practices, and Policy Implications of the U.S. Case," Communications & Strategies, 2006, pp. 107-125.

Zandbergen, "Accuracy of iPhone Locations: A Comparison of Assisted GPS, WiFi and Cellular Positioning," Transactions in GIS, 2009, pp. 5-25, Blackwell Publishing Ltd.

* cited by examiner

FIG. 21
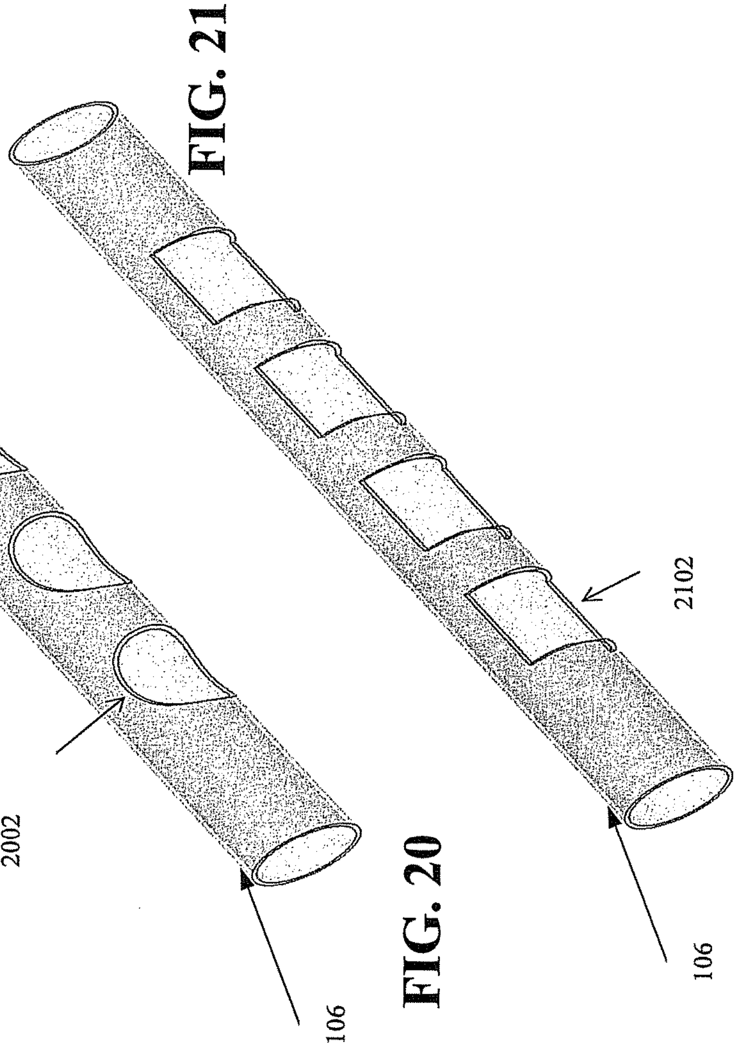
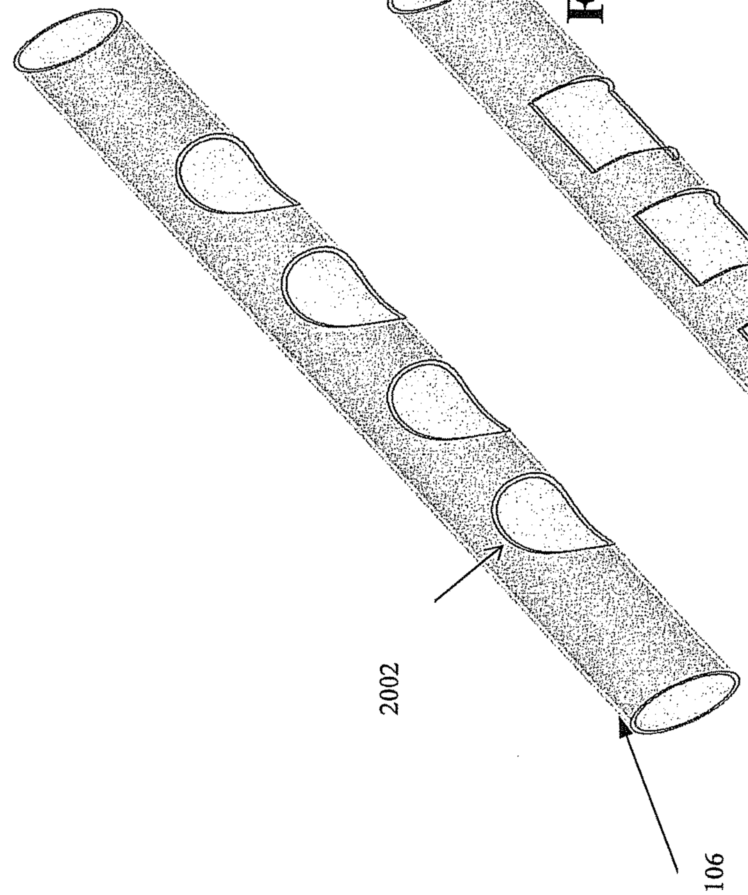
FIG. 20

FACILITATING WIRELESS COMMUNICATIONS VIA WIRELESS COMMUNICATION ASSEMBLY APPARATUSES

TECHNICAL FIELD

The subject disclosure relates generally to wireless communications, and to systems, apparatuses and methods of facilitating wireless communications via wireless communication assembly apparatuses.

BACKGROUND

In locations in which it is desirable to deploy Wi-Fi or other types of wireless communications, line-of-sight for conventional gateway devices and antennas may be poor. This problem is of particular relevance in large open air venues without overhead structures. Dense and controlled coverage is also typically a challenge due to the potentially large number of wireless communication devices (e.g., cellular telephones) and users in a small area. Additionally, aesthetics and visibility can be a concern in many situations. Finally, it is typically ideal to keep Wi-Fi signals overhead as frequencies in the 2.4 Gigahertz (GHz) band and the 5 GHz band are easily absorbed and attenuated by the users' bodies and other objects. Systems and methods that facilitate wireless communications in open air venues and other disparate environments are desirable.

BRIEF DESCRIPTION OF THE DRAWINGS

FIGS. 20 and 21 illustrate example schematic diagrams of housings having apertures in which antennas can be embedded in accordance with one or more embodiments.

DETAILED DESCRIPTION

Figure 1:
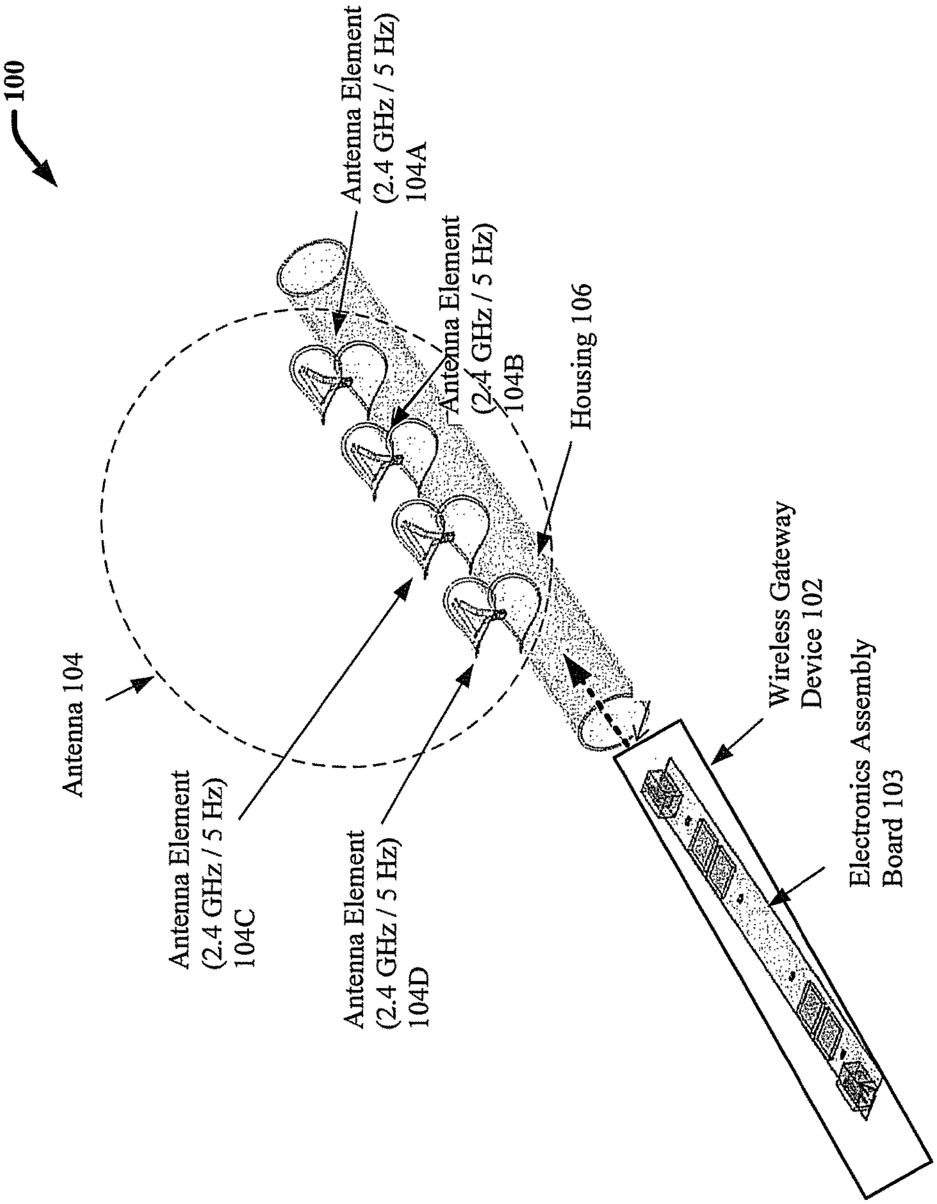
FIG. 1 illustrates an example schematic diagram detailing an exploded view of a communication assembly apparatus in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

In locations in which it is desirable to deploy Wi-Fi or other types of wireless communications, line-of-sight for conventional gateway devices and antennas may be poor. This problem is of particular relevance in large open air venues without overhead structures. Dense and controlled coverage is also typically a challenge due to the potentially large number of wireless communication devices (e.g., cellular telephones) and users in a small area. Additionally, aesthetics and visibility can be a concern in many situations. Finally, it is typically ideal to keep Wi-Fi signals overhead as frequencies in the 2.4 Gigahertz (GHz) band and the 5 GHz band are easily absorbed and attenuated by the users' bodies and other objects.

In conventional systems, solving the aforementioned challenges is typically handled by brute force. Approaches that place a large number of directional antennas overhead have problematic path loss and unpredictable/random network performance, which affects the users' experiences. Approaches that place the antennas on the floor/ground have unpredictable signal absorption and attenuation since signal typically passes through a larger section of body tissue to devices typically held at waist level or higher.

Embodiments described herein include systems, apparatus and/or computer-readable storage media including wireless communication assembly apparatuses having a wireless communication gateway device and an antenna. In one embodiment, a system includes a wireless gateway device located within a housing and having electrical connection elements for power and network connectivity. The system also includes an antenna coupled to the housing and electrically coupled to the wireless gateway device, wherein the housing is adapted to be masked on a surface of a support structure exposed to a defined environment, wherein the housing is configured to serve a first function and the support structure is configured to serve a second function, and wherein the first function is distinct from the second function.

Another embodiment includes a system including wireless communication assembly apparatuses positioned relative to respective support structures in a defined environment, wherein the wireless communication assembly apparatuses include respective wireless gateway devices electrically coupled to antennas and located within housings to which the antennas are coupled, wherein the wireless communication assembly apparatuses are adapted to be positioned relative to a support structure in the defined environment.

In yet another embodiment, a method including generating, by a wireless communication assembly apparatuses including a processor, a signal, wherein the wireless communication assembly apparatus comprises a wireless gateway device electrically coupled to an antenna; and transmitting, by the wireless communication assembly apparatus, to a communication device in a defined environment, the signal, wherein the wireless communication assembly apparatus is embedded within a cross-section of a support structure located in the defined environment and wherein the support structure comprises a hand rail.

Embodiments described herein can provide apparatuses that increase options for Wi-Fi deployment in difficult to deploy environments. For example, some embodiments include a wireless communication gateway device located substantially close to the user communication device and above floor/ground level. This arrangement can reduce path loss, interference and/or attenuation through bodies and other objects. In some embodiments, the communication assembly apparatus can be designed as a directional multiple-input multiple-output (MIMO) array such that a dense network can be planned. Network planning flexibility, and desirable performance can result.

FIG. 1 illustrates an example schematic diagram detailing an exploded view of a communication assembly apparatus in accordance with one or more embodiments. Communication assembly apparatus 100 can include a wireless gateway device 102 having an electronics assembly 103 and an antenna 104. The wireless gateway device 102 and the antenna 104 can be electrically and/or communicatively coupled to one another to perform one or more functions of communication assembly apparatus 100.

The wireless gateway device 102 can route wireless information/signals from one network to another network. The wireless gateway device 102 can also be an access point that can enable multiple wireless communication devices within the range of the wireless gateway device 102 to communicate via the wireless gateway device 102. In various embodiments, the wireless gateway device 102 can facilitate communication via the Wi-Fi communication protocol, Ethernet communication protocol or any number of other wired or wireless communication protocols. In some embodiments, wireless gateway device 102 can act as a hotspot allowing a wireless communication device (e.g., smart phone, tablet computer, digital camera, wireless audio player) to communicate via the wireless gateway device 102 using the 2.4 GHz and the 5 GHz bands to connect to the Internet. In some embodiments, the wireless gateway device 102 described herein can have a range of about 20 meters (66 feet) indoors and a greater range outdoors. The coverage of the wireless gateway device 102 can be expanded over a particular environment by overlapping coverage area of multiple wireless gateway devices within the environment, As shown, the wireless gateway device 102 includes electronics assembly board 103. Although not shown, in various embodiments, the wireless gateway device 102 can include any number of different components for facilitating the gateway communication functionality of the wireless gateway device 102.

The antenna 104 of the communication assembly apparatus 100 can include one or more antenna elements such as antenna elements 104A, 104B, 104C, 104D shown in FIG. 1. In some embodiments, the antenna 104 can be multiple-input multiple-output (MIMO) antenna. In the embodiment shown, as an example, the antenna 104 is a 4×4 MIMO directional horn antenna. Any number of different types and dimensions of MIMO antennas can be employed in different embodiments.

As described and shown, the wireless gateway device 102 of the communication assembly apparatus 100 can include an electronics assembly board 103. One or more of the wireless gateway device 102 (with electronics assembly board 103), antenna 104 and housing 106 can be electrically, mechanically and/or communicatively coupled to one another to facilitate performance of one or more functions of communication assembly apparatus 100. As used herein, housing 106 can be a structure exposed to an environment in an open air venue (e.g., bleacher handrail, stadium trash can, light pole) or any number of other environments in various different embodiments. For example, in some embodiments, housing 106 can be or include one or more aspects of the support structure described herein (e.g., support structure 302 of FIG. 2, etc.) and vice versa. In this regard, the housing 106 and the support structure 302 can be applied interchangeably in various embodiments described herein to provide additional variations in the materials, design, functionality and/or other aspects of the structures disclosed. In some embodiments, housing 106 can be a structure that can be embedded or otherwise partly or completely provided within a structure exposed to an environment in an open air venue or any number of other environments.

The wireless gateway device 102 (or the electronics assembly board 103 of the wireless gateway device 102) can be included within housing 106 on which antenna 104 can be disposed in some embodiments. In some embodiments, housing 106 is a thin profile structure.

Figure 2:
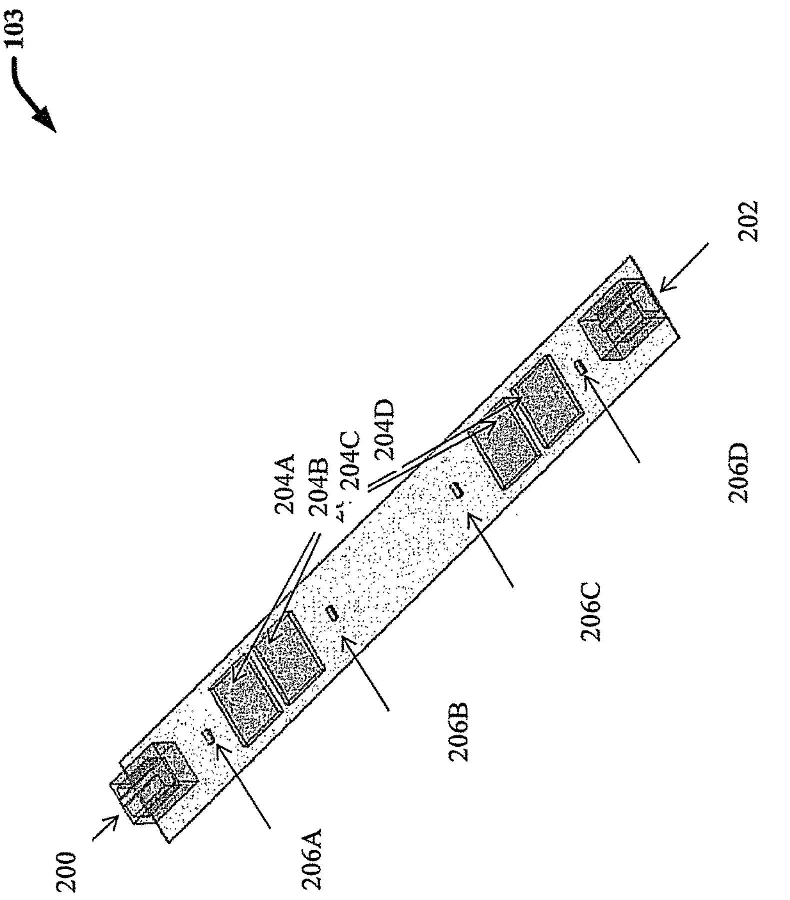
FIG. 2 illustrates an example schematic diagram of an electronics assembly of a wireless gateway device of the communication assembly apparatus of FIG. 1 in accordance with one or more embodiments described herein.

An embodiment of the electronics assembly board 103 is shown and described with greater detail with reference to FIG. 2. Repetitive description of like elements employed in other embodiments described herein is omitted for sake of brevity. As discussed with reference to FIG. 1, the wireless gateway device 102 includes an electronics assembly board 103. The electronics assembly board 103 can facilitate wireless gateway device 102 connectivity to a backhaul network via a first assembly connection 200 (or, in some embodiments, via a first assembly connection 200 and a second assembly connection 202 to allow daisy chaining of the wireless gateway device 102). In various embodiments, the first assembly connection 200 (or the first assembly connection 200 and the second assembly connection 202) facilitating connection to a backhaul network can be or include an Ethernet connection or a fiber connection configured to transmit and/or receive data.

In some embodiments, at least one of the first assembly connection 200 or the second assembly connection 202 can be a power connection to allow the wireless gateway device 102 to receive power. In some embodiments, the electronics assembly board 103 can be configured to be powered with Power over Ethernet (POE). POE includes, but is not limited to, an approach or system with components configured to provide a communication system that receives and/or transmits electrical power along with data/information via an Ethernet cabling/connection apparatus (e.g., first assembly connection 200 or second assembly connection 202). As such, employing POE, a single one of the first assembly connection 200 or the second assembly connection 202 can provide both data/information connection and electrical power to the wireless gateway device 102, generally, and/or electronics assembly board 103, specifically. In some embodiments, the power can be carried on the same conductors (e.g., first assembly connection 200 conductors) as the data/information, for example. In some embodiments, the power can be carried on a dedicated conductor of the first assembly connection 200.

The electronics assembly board 103 of the wireless gateway device 102 can include chipset electronics and radios (e.g., radios 204A, 204B, 204C, 204D) connected to one or more antenna launch points 206A, 206B, 206C, 206D, and configured to facilitate a desired type of communications. For example, in embodiments in which the gateway device is or includes a Wi-Fi gateway device, electronics assembly board 103 can include one or more Wi-Fi chipset electronics and supporting radios 204 to allow for MIMO operation of a Wi-Fi gateway device.

The radios 204A, 204B, 204C, 204D can include transmitters and receivers or transceivers in various different embodiments. For example, in some embodiments, the radio can include a power supply to provide electrical power to the transmitter; an oscillator to create alternating current at the frequency on which the transmitter/transceiver will transmit; a modulator to add the information to the signal to be transmitted; and an amplifier to amplify the modulated carrier wave to increase power. The receiver and/or transceiver can include a tuner and other filtering circuits for reception and processing a received signal.

The launch point design of the electronics assembly board 103 can facilitate multiple antenna feed options including, but not limited to, coaxial connector, feed/ground pads, and/or orthogonal printed circuit board transmission line launch. In some embodiments, the launch points 206A, 206B, 206C, 206D can be positioned such that the launch points 206A, 206B, 206C, 206D are separated from one another by approximately half wavelength distances (e.g., approximately 62.5 millimeters (mm) at the 2.4 Gigahertz (GHz) band) for Wi-Fi frequencies.

Figure 3:
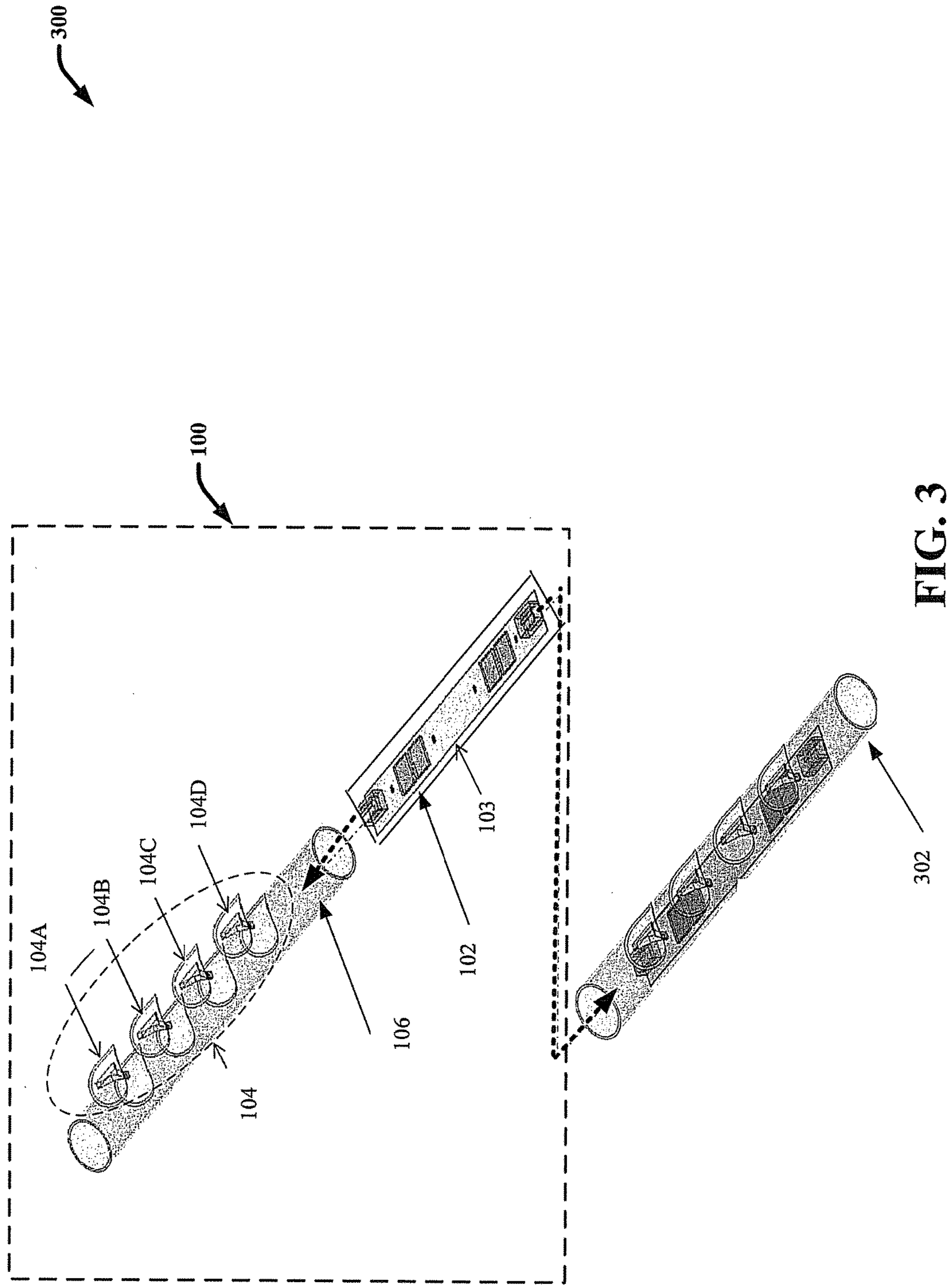
FIG. 3 illustrates an example schematic diagram detailing an exploded view of a communication assembly apparatus and a support structure in accordance with one or more embodiments.

FIG. 3 illustrates an example schematic diagram detailing an exploded view of components of a communication assembly apparatus and support structure in accordance with one or more embodiments. As shown, the communication assembly apparatus 100 can be embedded in a support structure 302. In other embodiments, the communication assembly apparatus 100 can be masked on or otherwise coupled to an outer surface of the support structure 302. Although the embodiment shown includes both a housing 106 and a support structure 302, in some embodiments, as described with reference to FIG. 1, the housing 106 can be or include one or more aspects that are the same as the support structure 302 and, as such, the diagram of FIG. 3 can encompass embodiments in which only communication assembly apparatus 100 is provided and the housing 106 of the communication assembly apparatus 100 is a support structure (e.g., stadium bleacher handrail). All such embodiments are envisaged.

In the embodiment shown in FIG. 3, the support structure 302 can be any number of different types of components. By way of example, but not limitation, the support structure 302 can be (or be included as part of) a hand rail, a fence post, a lamp post, a portion of a trash can, stage or other scaffolding. For example, in a stadium environment, the communication assembly apparatus 100 can be embedded in a hand rail provided alongside steps of stadium bleachers. Similarly, the communication assembly apparatus can be embedded in a cross-section of any number of different support structures. The communication assembly apparatus 100 can allow discrete and/or hidden wireless communication installation options. Embedding into (or masking on/coupling to) the hand rail or other support structures can also allow elevation of the communication assembly apparatus, which can result in desirable performance due to less path loss through attenuating objects including, but not limited to, bushes, brush, seating and/or human bodies.

Although not shown, in some embodiments, in addition to housing 106, the communication assembly apparatus can include an additional housing in which the antenna 104, housing 106 and wireless gateway device 102 (or electronics assembly board 103 of wireless gateway device 102) is provided. This communication assembly apparatus can be embedded in or masked on/coupled to an outer surface of the support structure 302 as well. Any of the functions described herein with reference to communication assembly apparatus can apply to the communication assembly apparatus that includes the additional housing in which the antenna 104, housing 106 and wireless gateway device 102 (or electronics assembly board 103 of wireless gateway device 102) is provided.

Figure 4:
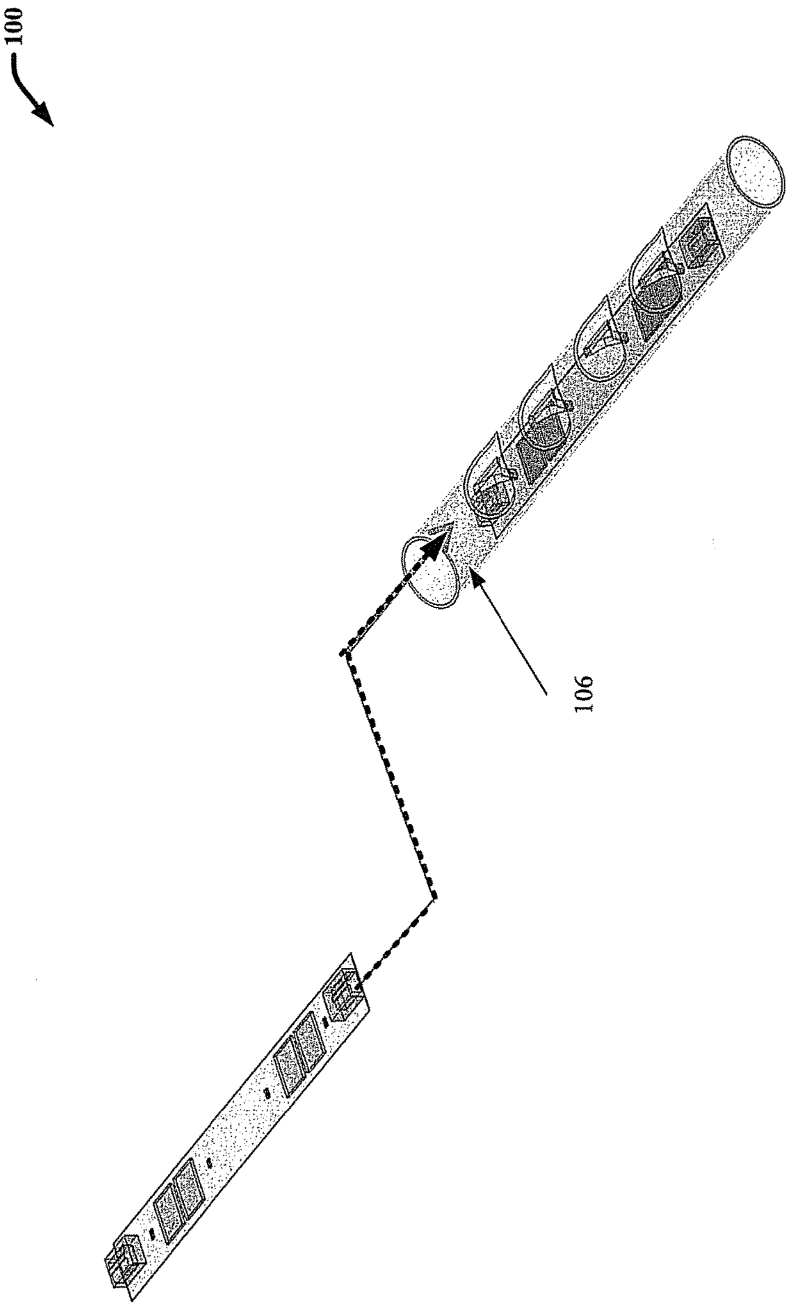
FIGS. 4 and 5 illustrate example schematic diagrams detailing exploded views of communication assembly apparatuses having housings of different profiles in accordance with one or more embodiments.
Figure 5:
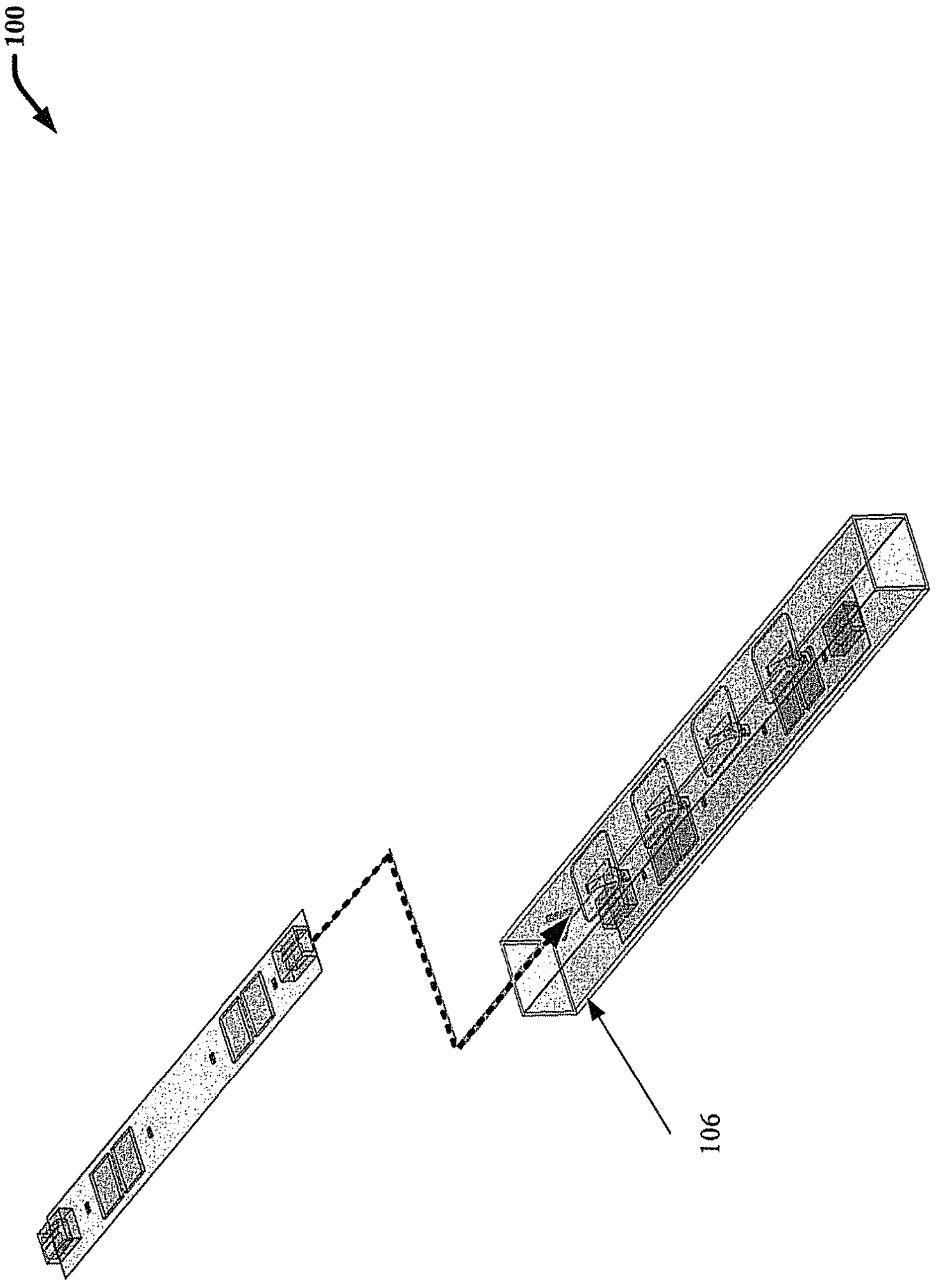

FIGS. 4 and 5 illustrate example schematic diagrams detailing exploded views of communication assembly apparatuses (e.g., communication assembly apparatus 100) having housings of different profiles in accordance with one or more embodiments. Repetitive description of like elements employed in other embodiments described herein is omitted for sake of brevity. As shown, the communication assembly apparatus 100 can have different profiles depending on application. For example, depending on the exterior shape, hollowness, material or other design feature of the support structure in which the communication assembly apparatus 100 will be embedded and/or based on whether the communication assembly apparatus 100 will be embedded in a support structure or disposed on a surface of a support structure, the housing of the communication assembly apparatus 100 can differ. For example, in FIG. 4, housing 106 has a circular profile while housing 106 of FIG. 5 has a square profile.

The housing 106 can be composed of a number of various materials or combinations of materials (e.g., both metallic and non-metallic portions). The size and/or profile of the housing 106 can differ in different embodiments. However, in some embodiments, the size and/or profile of the housing 106 can be such that the housing 106 is large enough to contain the wireless gateway device 102.

Figure 6:
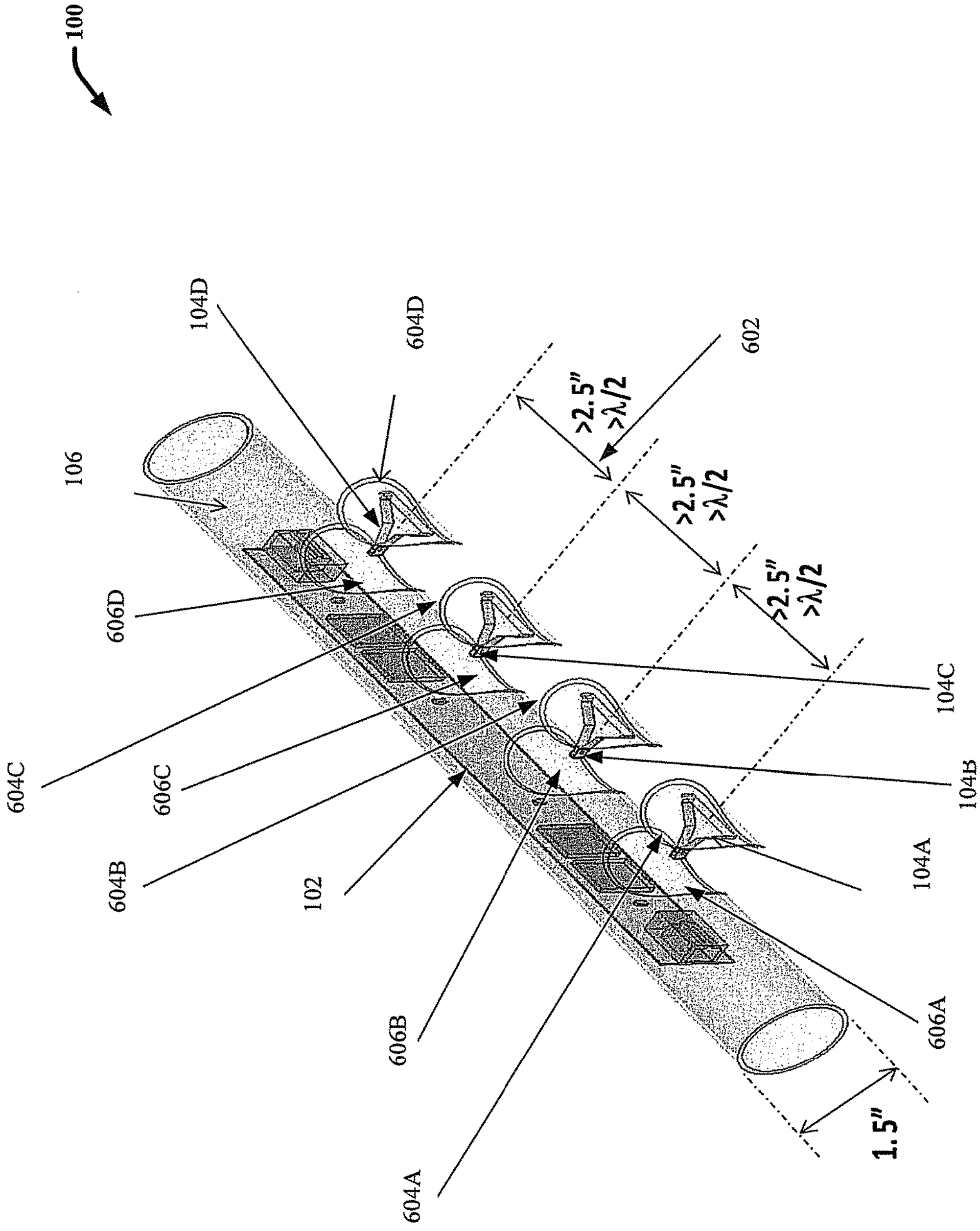
FIGS. 6 and 7 illustrate example schematic diagrams detailing exploded views of communication assembly apparatuses having housings of different profiles and having components with different dimensions in accordance with one or more embodiments.
Figure 7:
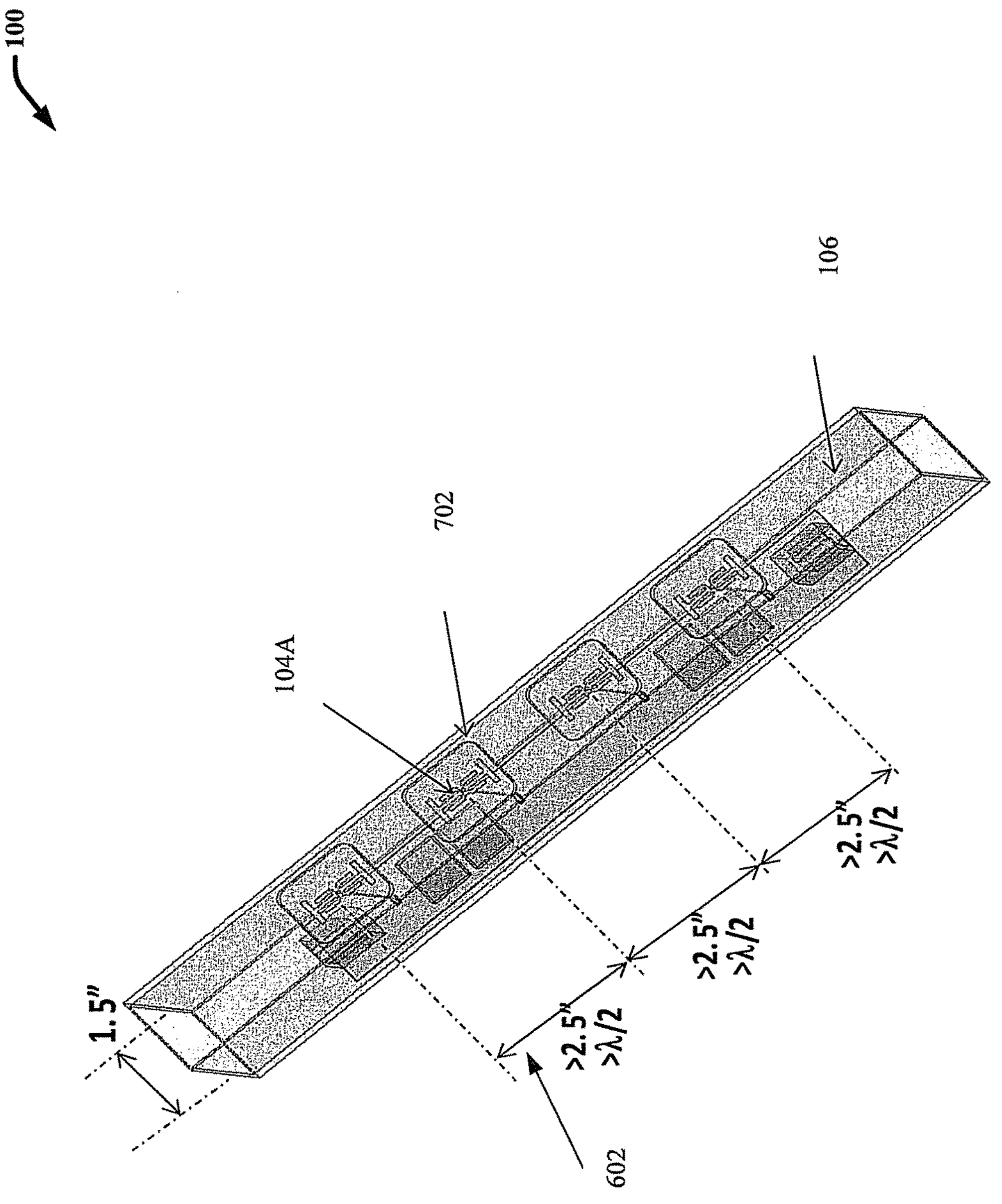

FIGS. 6 and 7 illustrate example schematic diagrams detailing exploded views of communication assembly apparatuses (e.g., communication assembly apparatus 100) having housings of different profiles and having components with different dimensions in accordance with one or more embodiments. Repetitive description of like elements employed in other embodiments described herein is omitted for sake of brevity.

FIGS. 6 and 7 illustrate example schematic diagrams detailing exploded views of communication assembly apparatuses having housings of different profiles and having components with different dimensions in accordance with one or more embodiments. FIG. 6 shows a housing 106 (e.g., ADA-compliant handrail) formed of a structural metal tube. FIG. 7 shows a housing 106 having a square profile and can be formed of any number of different types of materials (or combinations of materials). For example, the square profile of FIG. 7 can be employed for aesthetic purposes in some embodiments. In each of the embodiments shown in FIGS. 6 and 7, the housing 106 can be a tube of a particular shape/profile configured to receive at least a portion of the wireless gateway device 102. As discussed, the housing 106 can be a metallic tube or other structural support mechanism in an environment (e.g., open air or otherwise). In various embodiments, the housing 106 can be metallic or non-metallic (or a combination of metallic and non-metallic materials) based on design, antenna desired performance or other considerations.

In some embodiments, the housing 106 can be sized to accommodate half wavelength spacing between the elements 104A, 104B, 104C, 104D of the antenna. For example, to facilitate provisioning of Wi-Fi service at 2.4 Gigahertz (GHz), the antenna elements 104A, 104B, 104C, 104D can be spaced approximately every 62.5 millimeters (mms) along the housing 106. In some embodiments, the wavelength (λ/2) spacing 602 between the elements 104A, 104B, 104C, 104D, and/or the size that can facilitate having an Ethernet cable attached to one or more ends of the wireless gateway device 102, can dictate the minimum size (e.g., length) of the housing 106 in some embodiments.

As shown, in some embodiments, covers 604A, 604B, 604C, 604D can be provided over one or more of (or over each of) the respective elements 104A, 104B, 104C, 104D of the antenna. The covers 604A, 604B, 604C, 604D can be formed of plastic or other non-conductive material to facilitate functionality of the antenna in some embodiments. For example, elements 104A, 104B, 104C, 104D can be metallic horn element of an antenna positioned on respective covers 604A, 604B, 604C, 604D. In FIG. 7, the element 104A shown is a dipole antenna element. A plastic non-conductive antenna cover 702 is provided over the element 104A. The design of the antenna elements can be modified as needed to complement the various geometries and/or materials of the housing 106.

In some embodiments, the housing 106 can be a handrail or other support structure in which the wireless gateway device 102 can be embedded and/or on which the antenna 104 can be masked (or in which the elements 104A, 104B, 104C, 104D can be embedded). An embodiment can also be provided such that size and/or strength constraints of the housing 106 meet American Disabilities Act (ADA) specifications for handrails and/or other support structures (e.g., housing 106 can have a diameter of approximately 1.25 to 1.5 inches).

In some embodiments, the housing 106 can be sized and/or designed to have a form or material composition that can serve another purpose (other than housing the wireless gateway device 102 and/or antenna 104). For example, the housing can be sized and/or designed to serve as a handrail, light post or the like.

In some embodiments, the housing 106 can be shaped as a rectangular prism or cuboid. The housing 106 can be formed as part of the composite wall structure of a handrail or other support structure. For example, a portion of the wall/surface of a handrail be removed and the housing 106 inserted into the wall/surface.

FIGS. 8, 9, 10 and 11 illustrate block diagrams of cross-sectional views of communication assembly apparatuses in accordance with one or more embodiments. Different embodiments of communication assembly apparatuses are shown in the drawings. As shown, in different embodiments, different numbers and/or profiles of housings can be employed. In various embodiments, housing 802 can include one or more of the structure and/or functionality of housing 106 and/or support structure 302 (and vice versa). Repetitive description of like elements employed in other embodiments described herein is omitted for sake of brevity.

Figure 8:
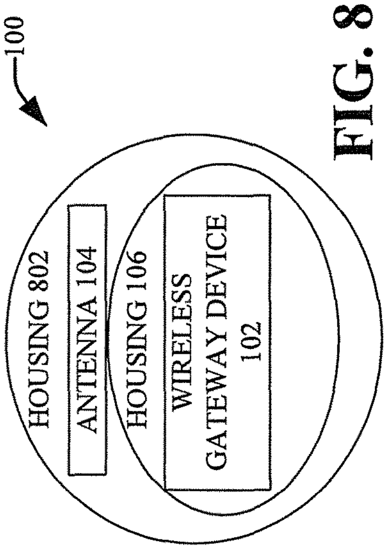
FIGS. 8, 9, 10 and 11 illustrate block diagrams of cross-sectional views of communication assembly apparatuses in accordance with one or more embodiments.

FIG. 8 illustrates a communication assembly apparatus 100 in which the wireless gateway device 102 is located within housing 106 (which has a substantially circular profile), antenna 104 is disposed on housing 106 and housing 802 has a substantially circle profile and envelopes the antenna 104, housing 106 and wireless gateway device 102. For example, housing 802 can be or include one or more of the structure and/or functionality of support structure in some embodiments (e.g., housing 802 can be a handrail or be a component that is able to be integrated with/integrated with or formed as a composite structure with a handrail or other structure).

Figure 9:
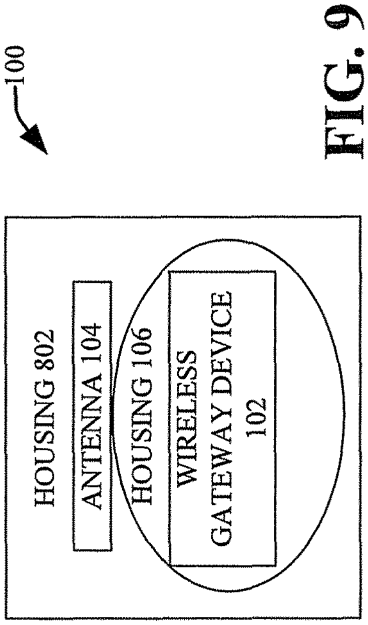

FIG. 9 illustrates a communication assembly apparatus 100 in which the wireless gateway device 102 is located within housing 106 (which has a substantially circular profile), antenna 104 is disposed on housing 106 and housing 802 has a substantially square profile and envelopes the antenna 104, housing 106 and wireless gateway device 102.

Figure 10:
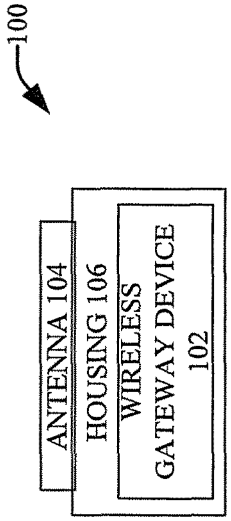

FIG. 10 illustrates a communication assembly apparatus 100 in which the wireless gateway device 102 is located within housing 106 (which has a substantially rectangular or square profile), antenna 104 is disposed on housing 106 and housing 802 has a substantially circle profile and envelopes the antenna 104, housing 106 and wireless gateway device 102.

Figure 11:
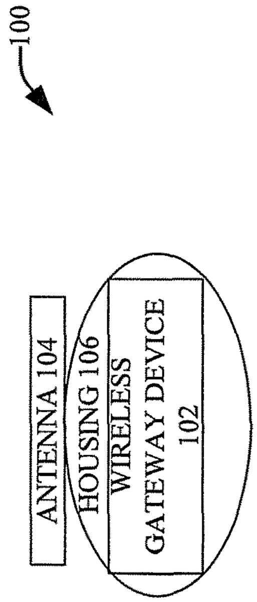

FIG. 11 illustrates a communication assembly apparatus 100 in which the wireless gateway device 102 is located within housing 106 (which has a substantially rectangular or square profile), antenna 104 is disposed on housing 106 and housing 802 has a substantially square profile and envelopes the antenna 104, housing 106 and wireless gateway device 102.

Although not shown, in some embodiments, a communication assembly apparatus 100 can include a wireless gateway device 102 and antenna 104 embedded in a housing/support structure.

FIGS. 12, 13, 14 and 15 illustrate block diagrams of cross-sectional views of support structures with embedded communication assembly apparatuses in accordance with one or more embodiments. As shown, in different embodiments, different combinations of profiles for communication assembly apparatuses and support structures can be provided. Further, in some embodiments, although not shown, apertures can be provided in/through the wall/surface of the support structure to facilitate communication to/from the communication assembly apparatus 100. Repetitive description of like elements employed in other embodiments described herein is omitted for sake of brevity.

Figure 12:
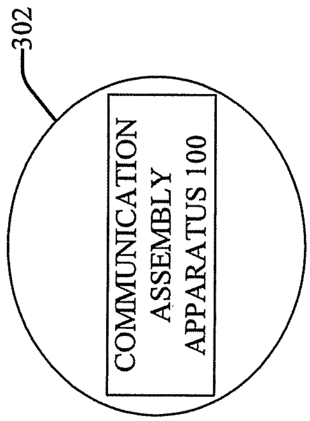
FIGS. 12, 13, 14 and 15 illustrate block diagrams of cross-sectional views of support structures with embedded communication assembly apparatuses in accordance with one or more embodiments.
Figure 13:
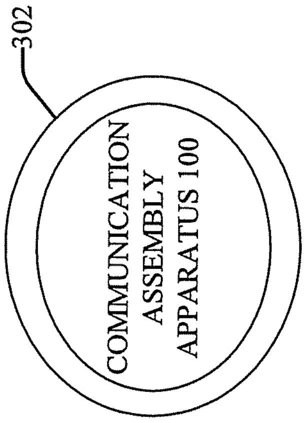
Figure 14:
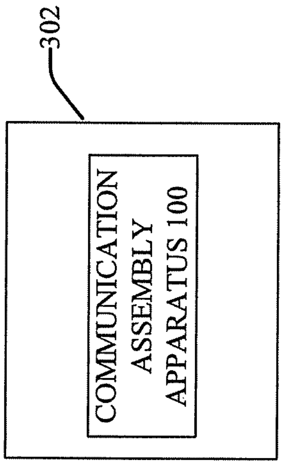
Figure 15:
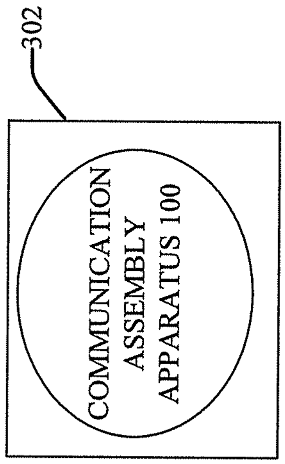
Figure 16:
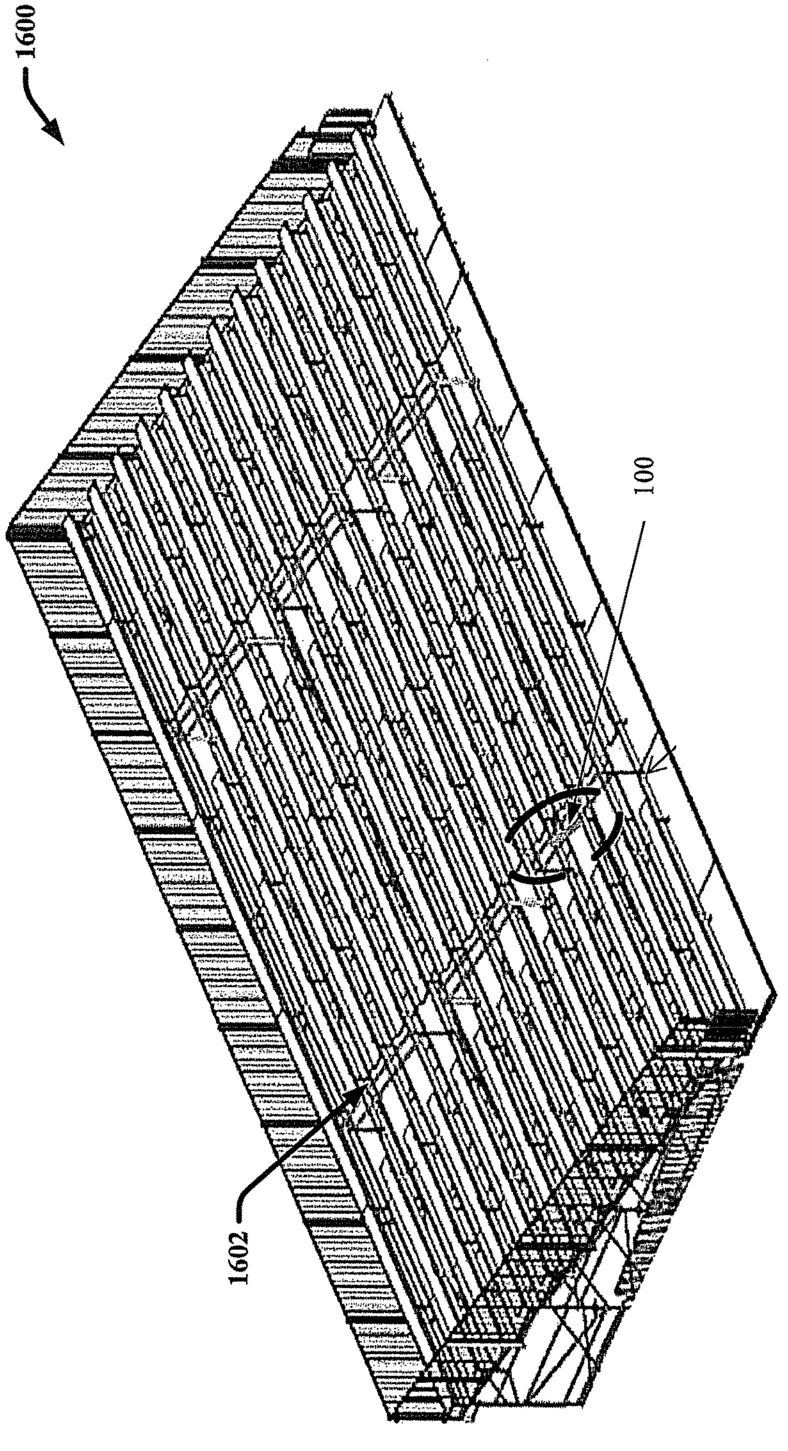
FIGS. 16, 17, 18 and 19 illustrate example schematic diagrams of systems including support structures and communication assembly apparatuses embedded within or disposed on a surface of different support structures in accordance with one or more embodiments.

FIG. 12 illustrates a communication assembly apparatus 100 that has a rectangular or square profile and support structure 302 that has a circular profile. FIG. 13 illustrates a communication assembly apparatus 100 that has a rectangular or square profile and support structure 302 that has a rectangular or square profile. FIG. 14 illustrates a communication assembly apparatus 100 that has a circular profile and support structure 302 that has a circular profile. FIG. 15 illustrates a communication assembly apparatus 100 that has a circular profile and support structure 302 that has a rectangular or square profile.

FIGS. 16, 17, 18 and 19 illustrate example schematic diagrams of systems including support structures and communication assembly apparatuses embedded within or disposed on a surface of different support structures in accordance with one or more embodiments. Repetitive description of like elements employed in other embodiments described herein is omitted for sake of brevity.

The communication assembly apparatus 100 can be embedded or used in custom enclosures (not shown) in some embodiments. The custom enclosure can be attached and/or masked onto the support structures 1602, 1602, 1802, 1902 in some embodiments. In various embodiments, one or more of the structure and/or functionality can be the same or similar to the structure and/or functionality of support structure 302 (and vice versa).

In some embodiments, the support structure and/or communication assembly apparatus can be designed to retain needed strength to meet load bearing specifications of the support structure. The communication assembly apparatus 100 can be either permanently or temporarily embedded within or masked/disposed on the support structure in different embodiments.

As shown, support structure 1602 can be a section of hand rail (e.g., a section of hand rail from a large open-air stadium, stadium bleacher, a section of a hand rail from a theater seating area). In many venues (e.g., stadiums, theaters) hand rails are of standard height to meet ADA requirements and can have useable line-of-site heights. Further, most hand rails meet ADA dimensions of approximately 1.25 inches to approximately 2 inch diameter. The communication assembly apparatus 100 can be embedded into the pipe section of the hand rail such that the communication assembly apparatus 100 is not noticeable.

Figure 17:
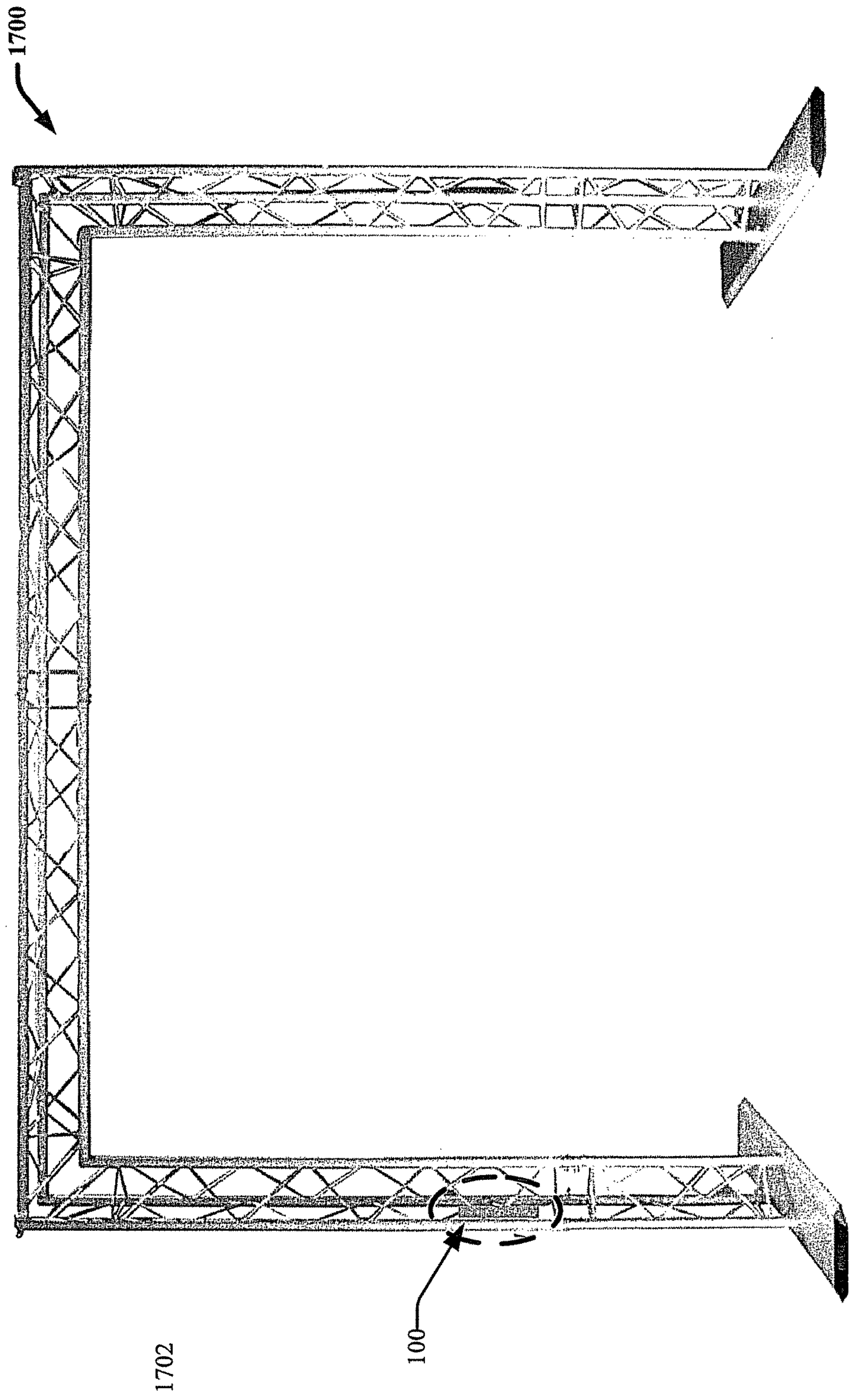
Figure 19:
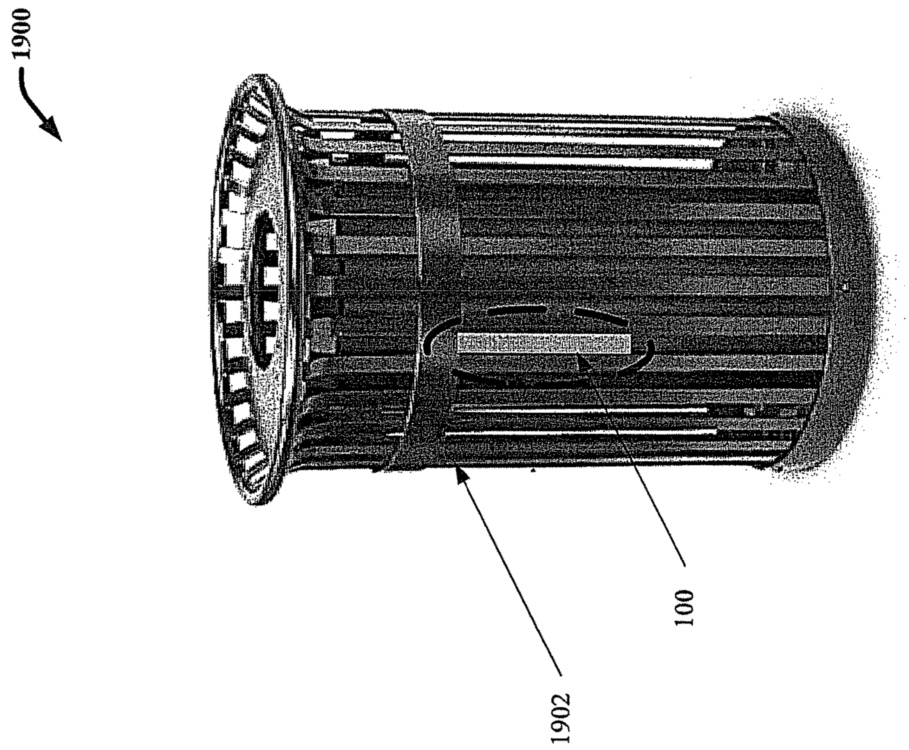
Figure 18:
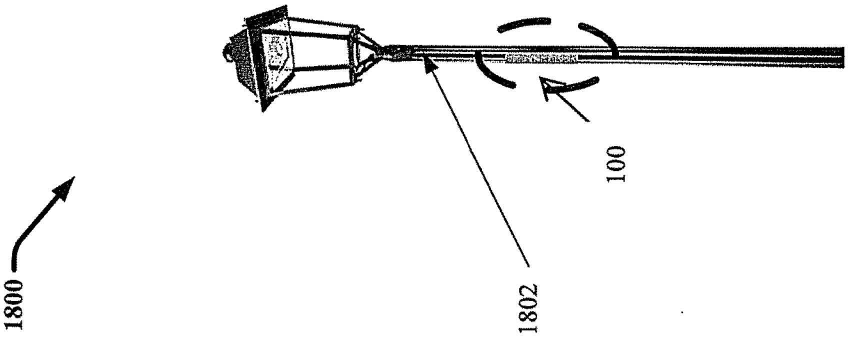

Turning to FIG. 17, support structure 1702 can be a stage support and/or scaffolding. Support structure 1802 can be a lamp post while support structure 1902 can be a trash can. In various embodiments, other support structures can include, but are not limited to, a component of a fence, signage post or the like.

In various embodiments, the communication assembly apparatus 100 can be embedded within a cross-section of at least a portion of support structure 1602, 1702, 1802, 1902. In an embodiment in which system 1600, 1700, 1800, 1900 includes the communication assembly apparatus 100 embedded within a support structure (e.g., support structure 1602, 1702, 1802, 1902), the support structure 1602, 1702, 1802, 1902 can be designed such that the original structure of which the support structure is a part retains strength. An example would be providing a circular cut out from the support structure 1602, 1702, 1802, 1902 to retain strength for the Americans with Disabilities Act (ADA) requirements on the support structure. The flexibility and thin profile of the communication assembly apparatus 100 can allow for use within a variety of objects.

The communication assembly apparatus 100 can be designed with different types of antenna elements to provide different signal radiation patterns and allow for embedding the communication assembly apparatus 100 in support structures (e.g., support structures 1602, 1702, 1802, 1902) having different materials. The antenna can support the 2.4 GHz and 5 GHz Wi-Fi bands.

In some embodiments, a metallic handrail can include a non-conductive section to allow for radiation of waves from the one or more elements of the antenna 104. As such, in embodiments in which the handrail is metal, one or more metal sections of the handrail can be removed from the metallic section. In order to retain strength of the handrail, the one or more sections removed can be sized to be minimally invasive and geometrically sound. For example, as shown in FIGS. 20 and 21, removing a circular/saddle smooth shaped aperture 2002 provided through the surfaced of housing 106 can allow for the most strength retention (as compared to removing a similarly sized square shaped aperture 2102 with sharp angles from housing 106). Also, in some embodiments, the antenna element section can be flush mounted within the aperture 2002 area to provide an unobstructed grip surface for ADA requirements.

FIGS. 22, 23, 24 and 25 illustrate example schematic diagrams of exploded views of communication assembly apparatuses with different types of antennas in accordance with one or more embodiments. Repetitive description of like elements employed in other embodiments described herein is omitted for sake of brevity.

Figure 22:
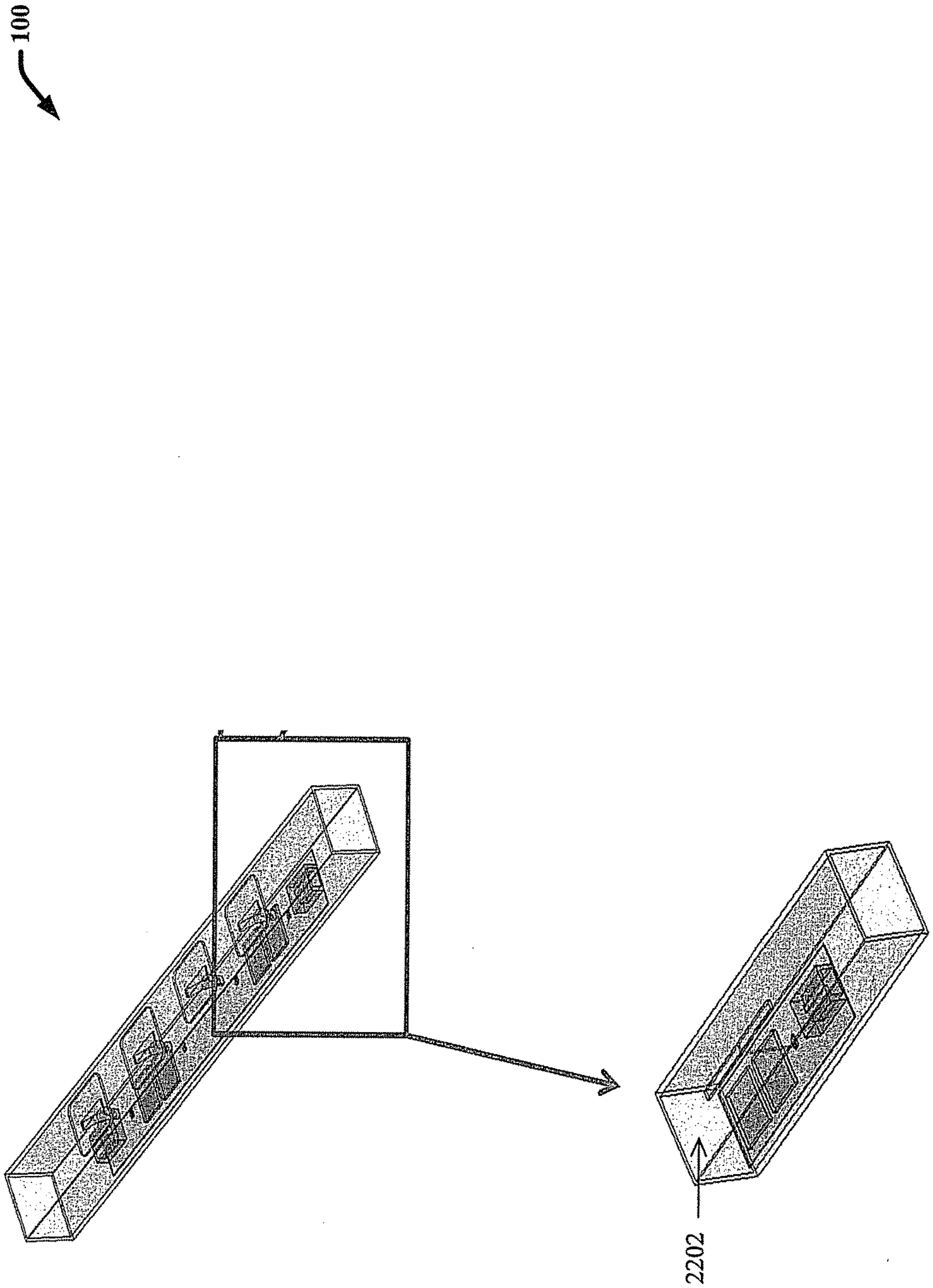
FIGS. 22, 23, 24 and 25 illustrate example schematic diagrams of exploded views of communication assembly apparatuses with different types of antennas in accordance with one or more embodiments.

FIG. 22 shows a communication assembly apparatus 100 having a resonant slot antenna 2202. In some embodiments, the resonant slot antenna 2202 can be a slot antenna having a slot designed to be of size to enable a resonant frequency. For example, the slot antenna can be or include a metal substantially flat plate with a hole or slot through the plate, and which radiates in a radiation distribution pattern determined by the shape and/or size of the hole or slot and a driving frequency at which the plate is driven. In some embodiments, a slot antenna can be employed as a sector antenna for cellular telephone base station sectors.

Figure 23:
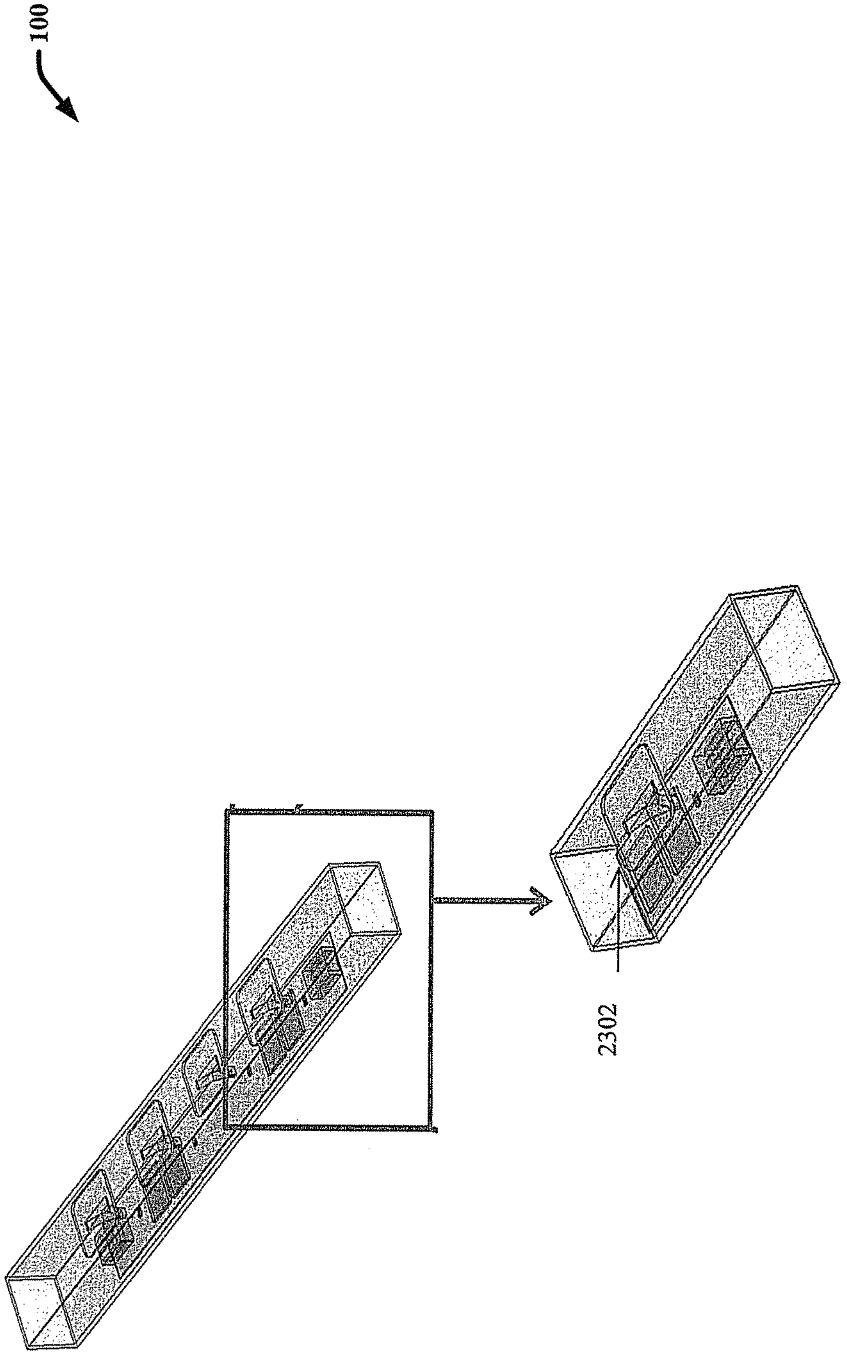

FIG. 23 shows a communication assembly apparatus 100 having a directional horn element 2302. In some embodiments, the horn element 2302 can be or be included as a horn antenna. In some embodiments, a horn antenna can be an antenna that includes a flaring metal waveguide shaped like a horn. The waveguide is shaped like a horn to direct radio waves in a beam. Horn antennas generally have no resonant elements and can operate over a wide range of frequencies, or bandwidth.

Figure 24:
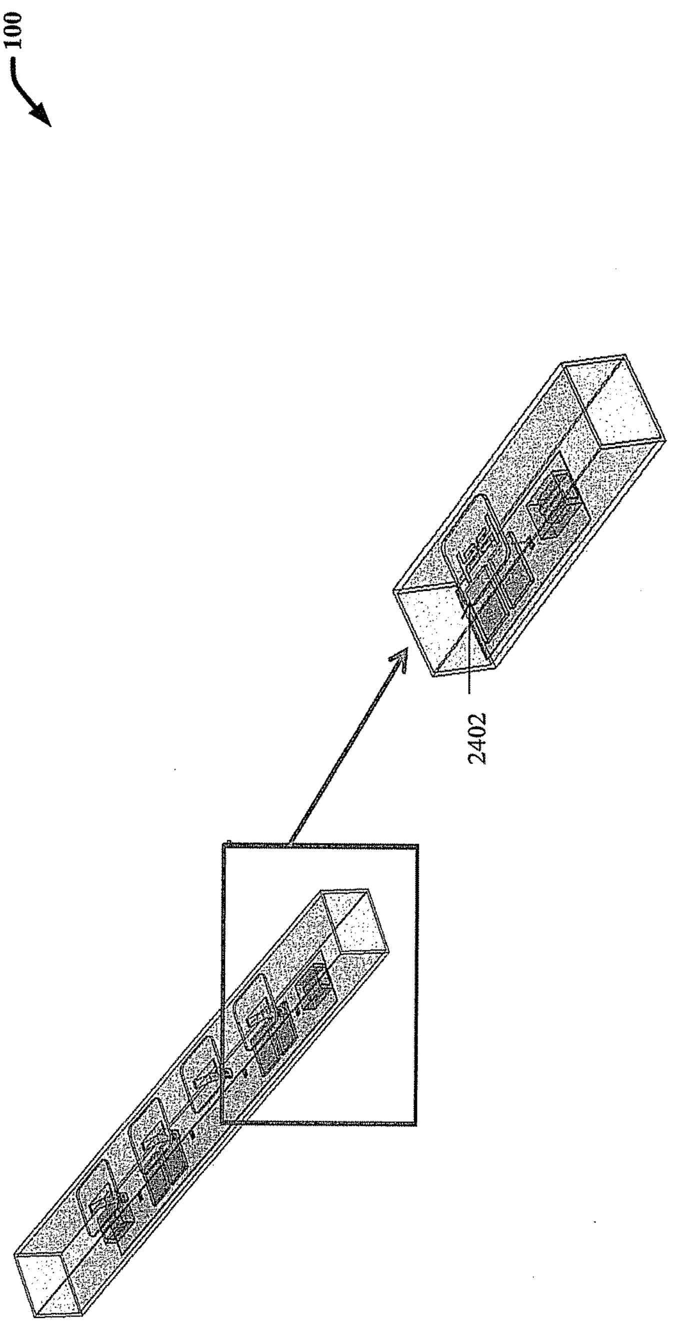

FIG. 24 shows a communication assembly apparatus 100 having at least one dipole element 2402 (or an array of dipole elements). In some embodiments, the dipole element 2402 is or is included in a dipole antenna. In some embodiments, a dipole antenna can be an antenna that radiates a substantially omnidirectional pattern, and substantially equal radio power in azimuthal directions perpendicular to the antenna.

Figure 25:
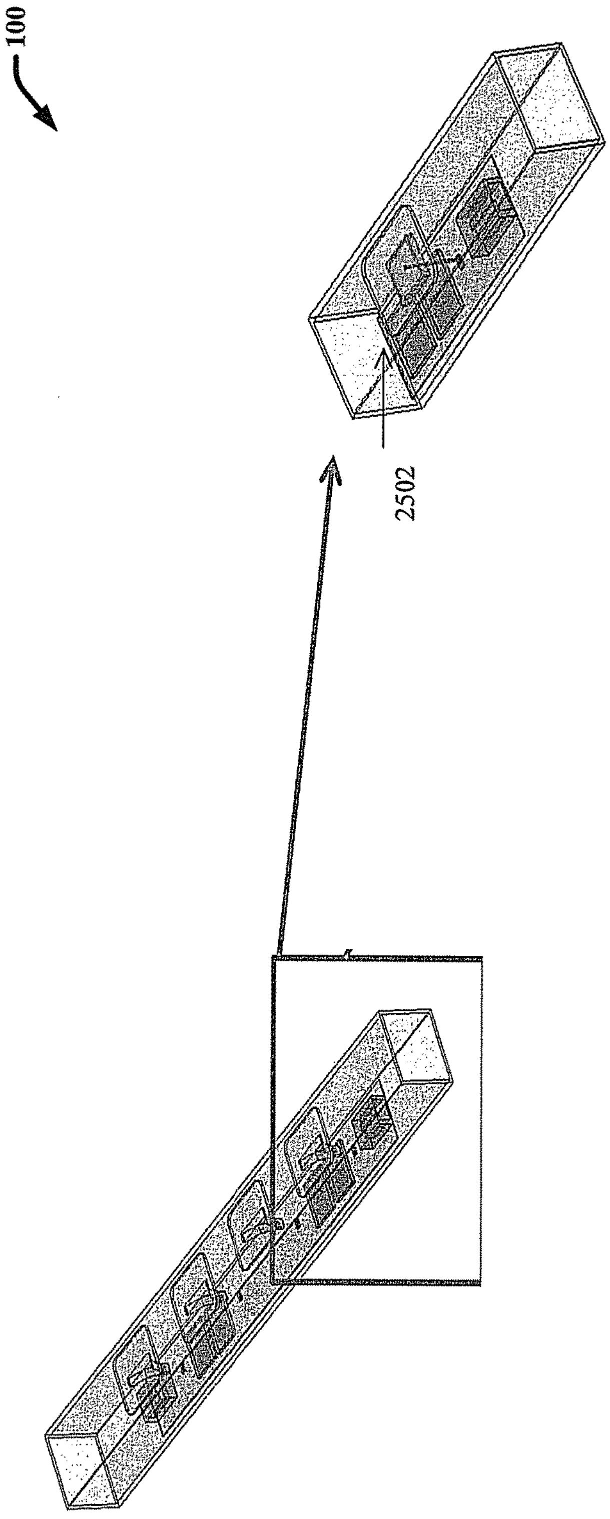

FIG. 25 shows a communication assembly apparatus 100 having at least one patch element 2502 (or an array of patch elements). In some embodiments, patch element 2502 is or is included in a patch antenna. In some embodiments, a patch antenna can be or can include a rectangular microstrip antenna including a substantially flat sheet of metal mounted over a ground plane sheet of metal. In some embodiments, the patch antenna is constructed on a dielectric substrate.

In some embodiments, along with the selected antenna elements, the orientation and/or the coverage of the antennas (or antenna elements) can be customized in the communication assembly apparatus 100. In some embodiments, the wireless gateway device 102 can be configured to provide a directional array of antennas to serve a user dense environment and provide scalability.

In one or more embodiments, the design (e.g., particular orientation, antenna design details, material, size, transmit power, receiver sensitivity and/or design aspects that address or are directed to issues such as predicted or expected attenuation) of the structure and/or functionality of the antenna 104 can be customized based on any number of factors. In some embodiments, the design can include structure and/or functionality that is customized for the particular implantation and/or available space within, or on the surface of, the support structure (e.g., support structure 1602, 1702, 1802, 1902). In some embodiments, the dimensions and/or material properties of the support structures (e.g., support structures 1602, 1702, 1802, 1902) and/or housings (e.g., housings 106, 602) can affect the tuning of the antenna 104.

As such, in some embodiments, a size-reduced structure can reduce flexibility for the antenna 104 and can limit optimal performance.

Figures 26, 27, 28:
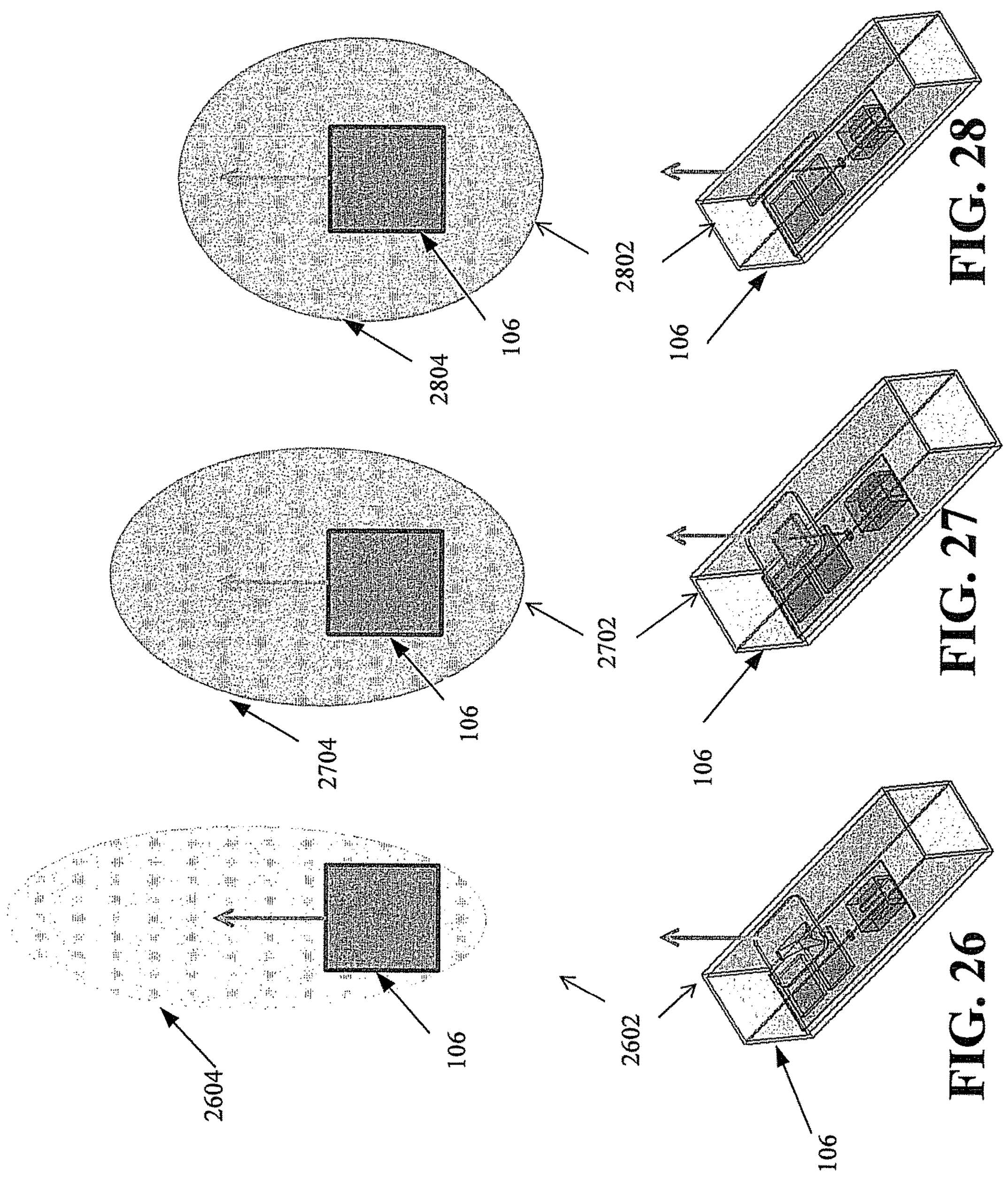
FIGS. 26, 27 and 28 illustrate example schematic diagrams of different types of antennas and corresponding types of coverage in accordance with one or more embodiments.

FIGS. 26, 27 and 28 illustrate example schematic diagrams of different types of antennas and corresponding types of coverage in accordance with one or more embodiments. The one or more elements of the antenna 104 can be designed for various coverage goals in different embodiments. By way of example, but not limitation, a 2 inch diameter square structure can facilitate a variety of options. As shown in FIG. 26, a deep horn structure 2602 or a larger high dielectric patch structure can provide narrow beam coverage 2604. As shown in FIG. 27, an inward offset dipole or smaller patch antenna 2702 can provide wider range directional coverage 2704. As shown in FIG. 28, a surface mounted dipole or slot antenna 2802 can provide more omnidirectional coverage 2804. Also the directivity or lack thereof can be oriented around the axis of the structure as needed for coverage requirements. For example, a dipole faced directly upward on a horizontal structure would have equal coverage on both sides of the structure.

While FIGS. 25, 26, 27 and 28 illustrate examples of communication assembly apparatuses with different types of antennas, these descriptions are non-limiting and, in other embodiments, any number of other different types of antennas can be employed. By way of example, but not limitation, in some embodiments, one or more custom antennas can be employed in the communication assembly apparatuses. For example, a custom antenna can include or more structural or functional elements designed to perform one or more functions of an antenna. In some embodiments, the custom antenna includes structure and/or functionality that is a combination of one or more of the structure and/or functionality of patch, horn, dipole and/or slot antennas. In other embodiments, however, the custom antenna does not include a patch, horn, dipole or slot antenna and other different types of antennas can be designed and/or employed. In some embodiments, the custom antenna includes structure and/or functionality designed for enhanced performance of the communication assembly apparatuses described herein (e.g., a first antenna can be designed for particular performance in a first environment, based on a first set/number/type of expected mobile devices utilizing the custom antenna, based on whether the custom antenna is to be employed inside a support structure or on an outside of a surface of a support structure while a second antenna can be designed for particular performance in a second environment, based on a second set/number/type of expected mobile devices utilizing the custom antenna or the like). In some embodiments, a custom antenna can be designed and/or employed based on one or more desired performance features of a communication assembly apparatus described herein. All such embodiments are envisaged.

Figure 29:
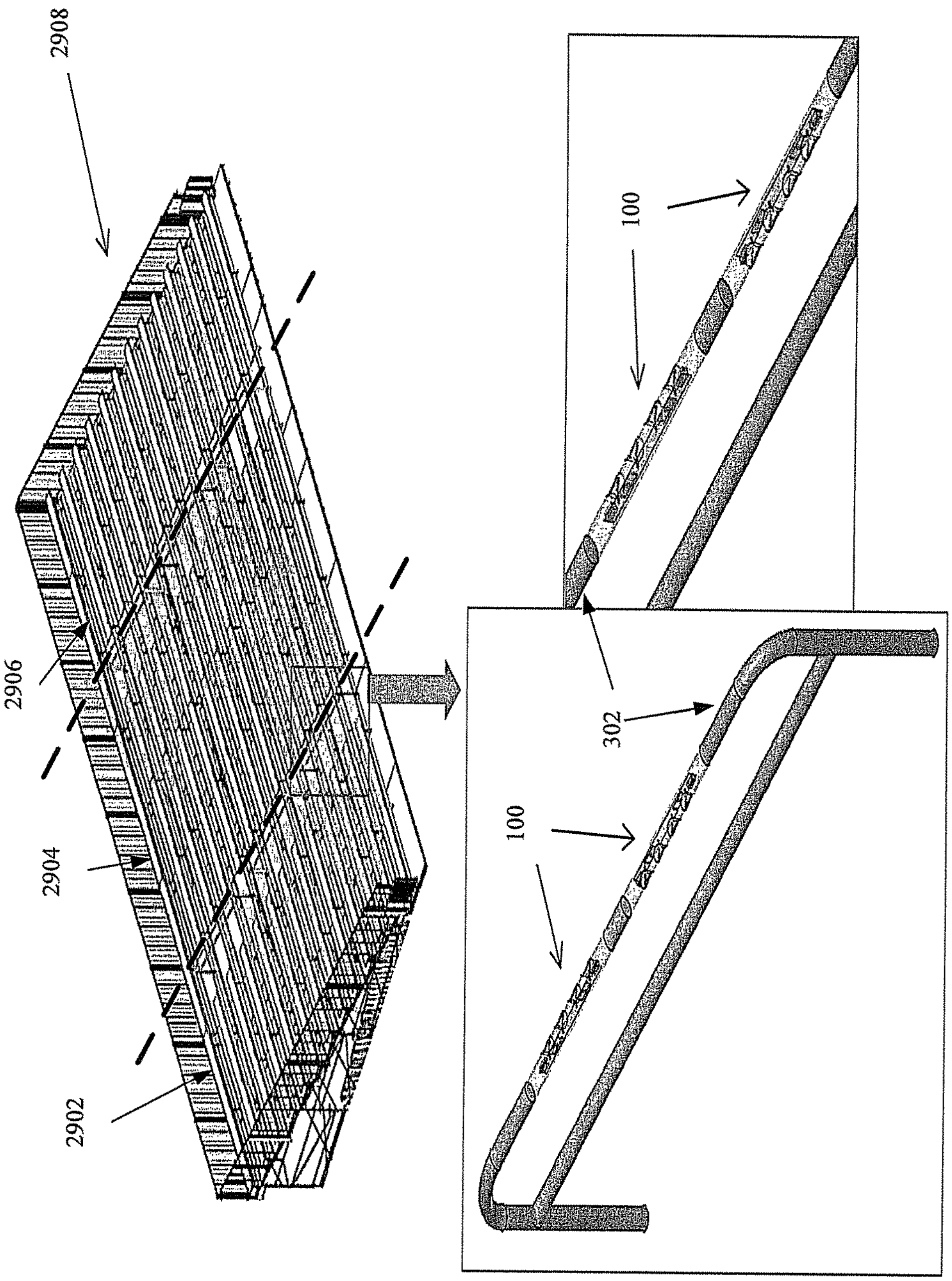
FIG. 29 illustrates an example schematic diagram of a system including a support structure and multiple embedded communication assembly apparatuses with horn antenna arrays in accordance with one or more embodiments.
Figure 30:
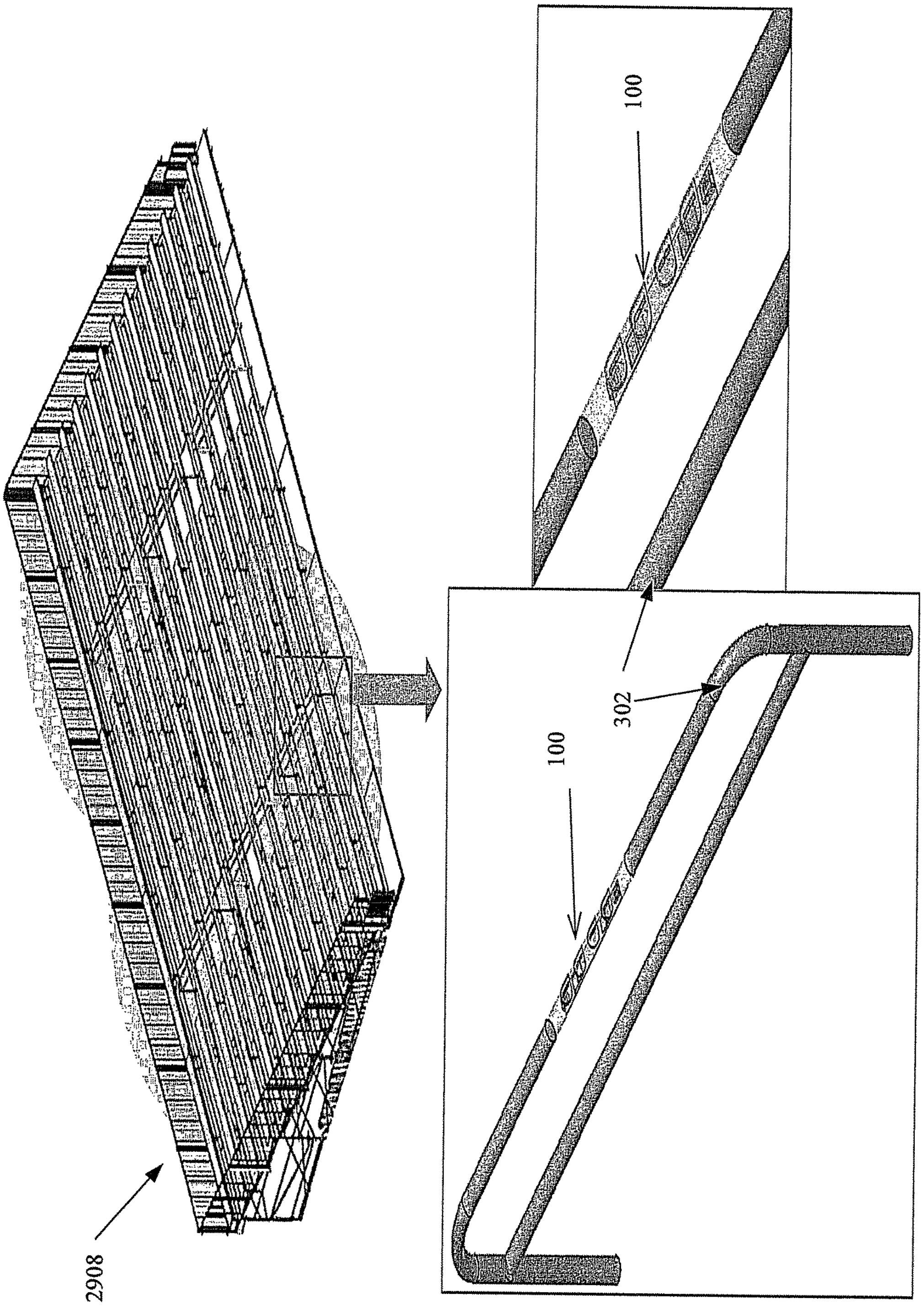
FIG. 30 illustrates an example schematic diagram of a system including a support structure and multiple embedded communication assembly apparatuses with single slot antennas in accordance with one or more embodiments.

FIG. 29 illustrates an example schematic diagram of a system including a support structure and multiple embedded communication assembly apparatuses with horn antenna arrays in accordance with one or more embodiments. FIG. 30 illustrates an example schematic diagram of a system including a support structure and multiple embedded communication assembly apparatuses with single slot antennas in accordance with one or more embodiments. Repetitive description of like elements employed in other embodiments described herein is omitted for sake of brevity.

As shown in FIGS. 29 and 30, in some embodiments, communication assembly apparatus 100 can be embedded in small cross section of a support structure (e.g., support structure 302 of FIG. 3) to facilitate the communication assembly apparatus 100 providing discrete and/or hidden Wi-Fi circuitry installation from within support structure 302. In some embodiments, this allows for elevation of the Wi-Fi service to higher than typical levels (e.g., at the hand rail level as opposed to the ground level) for improved Wi-Fi performance due to less path loss through attenuating objects (e.g., bushes/brush, seating, and human bodies). For example, two possible solutions are shown embedded in a hand rail support structure for open air stadium bleachers. By using different antenna elements and orientations there can be different radiation patterns and coverage.

One embodiment (shown in FIG. 29) uses two sets of the communication assembly apparatus 100 in each hand rail support structure 302. A first view is shown in the left diagram and an enlarged view is shown in the right diagram. This embodiment can support a scenario in which there is a desire to have dense coverage within the area in which the hand rail support structure 302 is located. By using antenna elements 104A, 104B, 104C, 104D (which, in this example, are directional horn antenna elements), one electronics assembly board 103 (or gateway including the electronics assembly board 103) can be embedded within and provide coverage from one side of the hand rail support structure 302, and the other communication assembly apparatus 100 can be embedded within a cross-section of and provide coverage from another (or, in some embodiments, the opposite) side of the hand rail support structure 302. This design can allow for dense coverage. In some embodiments, each of the neighboring sections 2902, 2904, 2906 of the stadium bleachers 2908 can be sectored by having each wireless gateway device 102 (or electronics assembly board 103 of the wireless gateway device 102) using a different communication channel (e.g., Wi-Fi channel).

Another embodiment (shown in FIG. 30) uses a configuration of a single slot antenna in the communication assembly apparatus 100 in each hand rail support structure 302. A first view is shown in the left diagram and an enlarged view is shown in the right diagram. This embodiment can support a scenario in which there is a desire to have less dense coverage within the area in which the hand rail support structure 302 is located. A communication assembly apparatus 100 with a single slot antenna can provide less dense coverage in each support structure 302. This slot antenna can be centered and aimed to present omnidirectional coverage.

Figure 31:
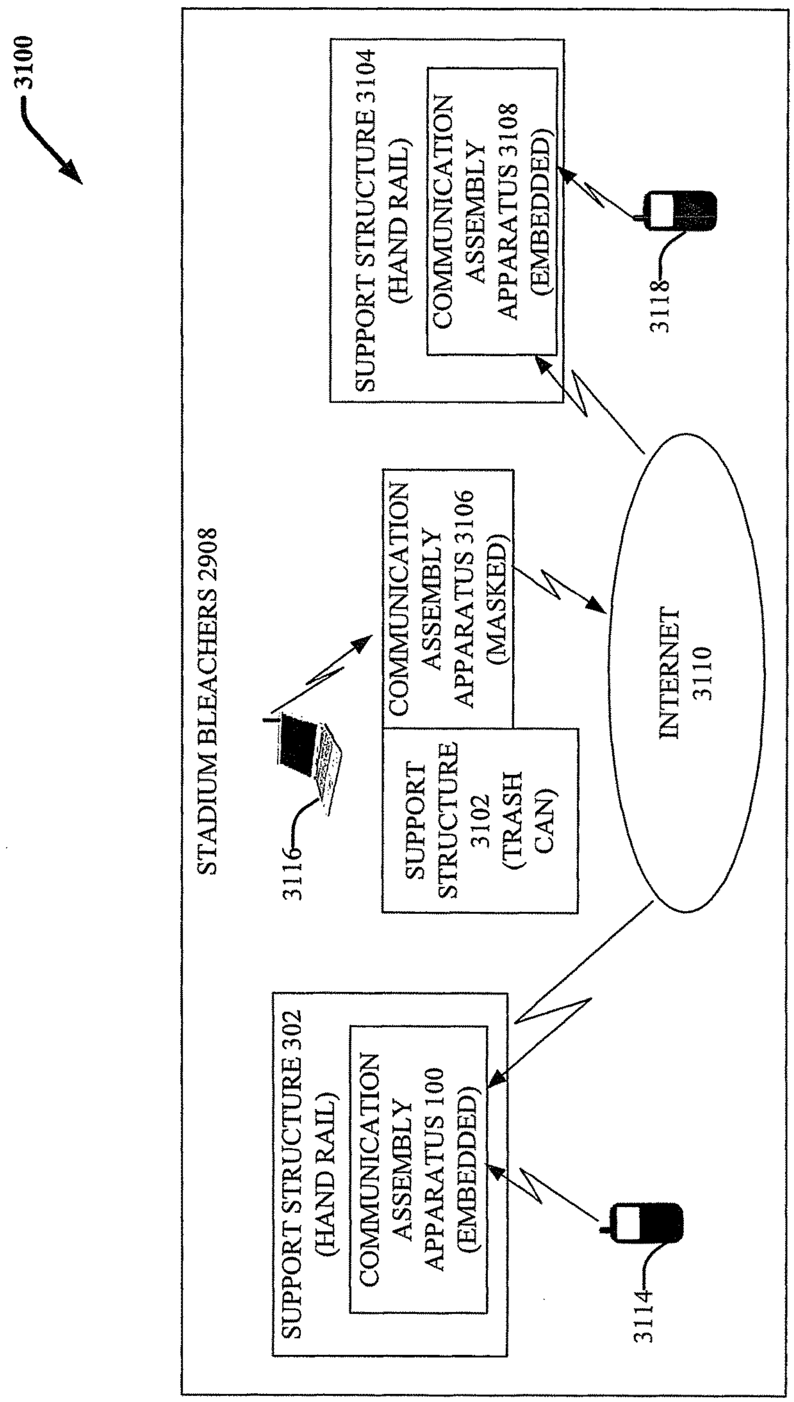
FIG. 31 illustrates an example block diagram of a system in an environment including multiple support structures that support respective communication assembly apparatuses in accordance with one or more embodiments.

FIG. 31 illustrates an example block diagram of a system 3100 in an environment including multiple support structures that support respective communication assembly apparatuses in accordance with one or more embodiments. Repetitive description of like elements employed in other embodiments described herein is omitted for sake of brevity. System 3100 includes support structures 302, 3102, 3104 and communication assembly apparatuses 100, 3106, 3108. In various embodiments, support structures 3102, 3104 can include one or more of the functions and/or structure of support structure 302 (and vice versa). Support structures 302, 3102, 3104 can be positioned at different locations within stadium bleacher 2908.

In various embodiments, communication assembly apparatuses 3106, 3108 can include one or more of the functions and/or structure of communication assembly apparatus 100 (and vice versa). Communication assembly apparatuses 100, 3106, 3108 can be electrically and/or communicatively coupled to one another and/or to the Internet 3110 or other network. In some embodiments, as shown, system 3100 can include communication devices 3114, 3116, 3118 that can be communicatively coupled to one or more of communication assembly apparatuses 100, 3106, 3108. In the embodiment shown, communication device 3114 is communicatively coupled to communication assembly apparatus 100, communication device 3116 is communicatively coupled to communication assembly apparatus 3106, and communication device 3118 is communicatively coupled to communication assembly apparatus 3108; in other embodiment, one of the communication devices can be moved to a different location within stadium bleacher 2908 and one or more of communication assembly apparatuses 100, 3106, 3108 can hand-off a call or data transmission in progress by the communication device to the communication assembly apparatus closest to the new location of the communication device.

As shown, communication assembly apparatuses 100, 3108 are embedded within respective support structures 302, 3104. Communication assembly apparatus 3106 can be masked or disposed on a surface of support structure 3102.

Figure 32:
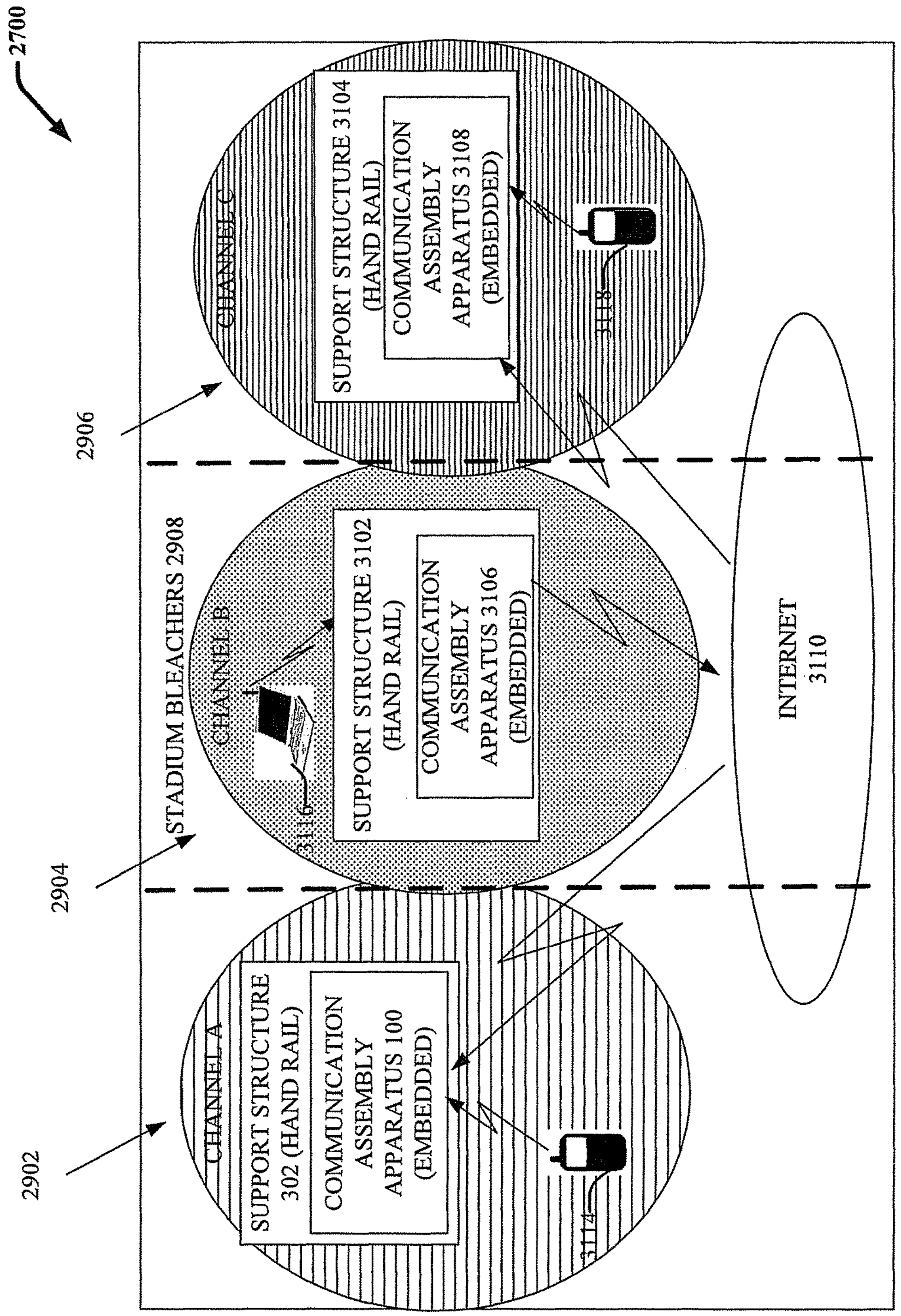
FIG. 32 illustrates an example block diagram of a system in an environment including multiple support structures that support respective communication assembly apparatuses that facilitate different wireless communication channels in accordance with one or more embodiments.

FIG. 32 illustrates an example block diagram of a system in an environment including multiple support structures that support respective communication assembly apparatuses that facilitate different wireless communication channels in accordance with one or more embodiments. Repetitive description of like elements employed in other embodiments described herein is omitted for sake of brevity. As shown, the communication assembly apparatuses 100, 3106, 3108 can be configured to provide communication on different channels (e.g., channels A, B, C) in the embodiment shown. In some embodiments, the communication assembly apparatuses 100, 3106, 3108 are located in different sectors of the stadium bleachers 2408. In some embodiments, configuration to communicate over different channels can reduce interference between the communication assembly apparatuses 100, 3106, 3108.

Figure 33:
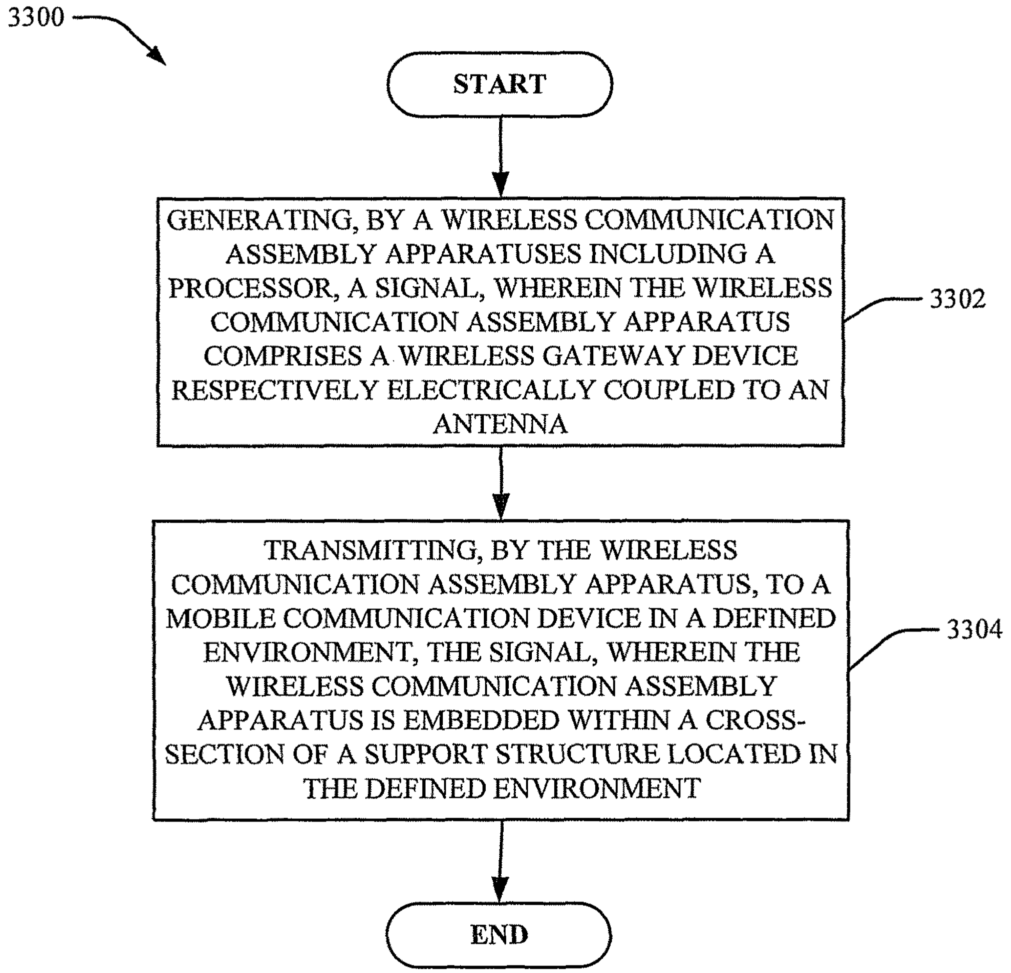
FIG. 33 illustrates an example flow diagram of a method of communication employing a communication assembly apparatus described herein in one or more embodiments.

FIG. 33 illustrates an example flow diagram of a method of communication employing a communication assembly apparatus described herein in one or more embodiments. At 3302, method 3300 can include generating, by a wireless communication assembly apparatuses including a processor, a signal, wherein the wireless communication assembly apparatus including a wireless gateway device 102 respectively electrically coupled to an antenna. At 3304, method 3300 can include transmitting, by the wireless communication assembly apparatus, to a communication device in a defined environment, the signal, wherein the wireless communication assembly apparatus is embedded within a cross-section of a support structure located in the defined environment. In various embodiments, the support structure includes any one of a fence, a hand rail, a lamp post, a scaffold, a trash can or the like.

Figure 34:
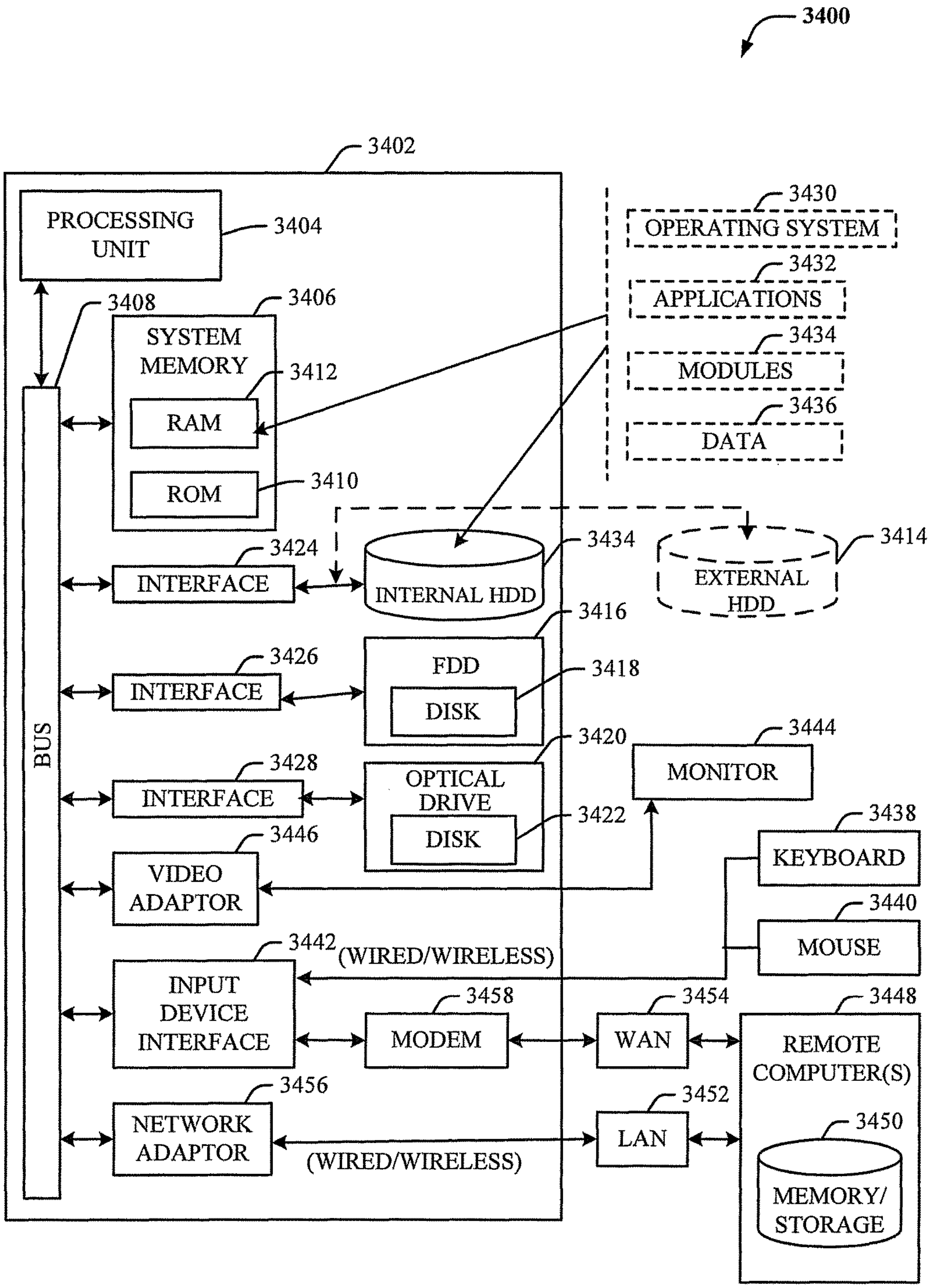
FIG. 34 illustrates a block diagram of a computer of or that can be employed with the communication assembly apparatuses described herein in accordance with one or more embodiments.

FIG. 34 illustrates a block diagram of a computer of or that can be employed with the communication assembly apparatuses described herein in accordance with one or more embodiments. Repetitive description of like elements employed in other embodiments described herein is omitted for sake of brevity.

In some embodiments, the computer can be or be included within any number of components described herein including, but not limited to, communication assembly apparatus 100 (or any components of communication assembly apparatus 100).

In order to provide additional text for various embodiments described herein, FIG. 34 and the following discussion are intended to provide a brief, general description of a suitable computing environment 3400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 34, the example environment 3400 for implementing various embodiments of the embodiments described herein includes a computer 3402, the computer 3402 including a processing unit 3404, a system memory 3406 and a system bus 3408. The system bus 3408 couples system components including, but not limited to, the system memory 3406 to the processing unit 3404. The processing unit 3404 can be any of various commercially available processors. Dual microprocessors and other multi-processor architectures can also be employed as the processing unit 3404.

The system bus 3408 can be any of several types of bus structure that can further interconnect to a memory bus (with or without a memory controller), a peripheral bus, and a local bus using any of a variety of commercially available bus architectures. The system memory 3406 includes ROM 3410 and RAM 3412. A basic input/output system (BIOS) can be stored in a non-volatile memory such as ROM, erasable programmable read only memory (EPROM), EEPROM, which BIOS contains the basic routines that help to transfer information between elements within the computer 3402, such as during startup. The RAM 3412 can also include a high-speed RAM such as static RAM for caching data.

The computer 3402 further includes an internal hard disk drive (HDD) 3410 (e.g., EIDE, SATA), which internal hard disk drive 3414 can also be configured for external use in a suitable chassis (not shown), a magnetic floppy disk drive (FDD) 3416, (e.g., to read from or write to a removable diskette 3418) and an optical disk drive 3420, (e.g., reading a CD-ROM disk 3422 or, to read from or write to other high capacity optical media such as the DVD). The hard disk drive 3414, magnetic disk drive 3416 and optical disk drive 3420 can be connected to the system bus 3408 by a hard disk drive interface 3424, a magnetic disk drive interface 3426 and an optical drive interface, respectively. The interface 3424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 3412, including an operating system 3430, one or more application programs 3432, other program modules 3434 and program data 3436. All or portions of the operating system, applications, modules, and/or data can also be cached in the RAM 3412. The systems and methods described herein can be implemented utilizing various commercially available operating systems or combinations of operating systems.

A mobile device can enter commands and information into the computer 3402 through one or more wired/wireless input devices, e.g., a keyboard 3438 and a pointing device, such as a mouse 3440. Other input devices (not shown) can include a microphone, an infrared (IR) remote control, a joystick, a game pad, a stylus pen, touch screen or the like. These and other input devices are often connected to the processing unit 3404 through an input device interface 3442 that can be coupled to the system bus 3408, but can be connected by other interfaces, such as a parallel port, an IEEE 1394 serial port, a game port, a universal serial bus (USB) port, an IR interface, etc.

A monitor 2944 or other type of display device can be also connected to the system bus 2908 via an interface, such as a video adapter 2946. In addition to the monitor 2944, a computer typically includes other peripheral output devices (not shown), such as speakers, printers, etc.

The computer 2902 can operate in a networked environment using logical connections via wired and/or wireless communications to one or more remote computers, such as a remote computer(s) 3448. The remote computer(s) 3448 can be a workstation, a server computer, a router, a personal computer, portable computer, microprocessor-based entertainment appliance, a peer device or other common network node, and typically includes many or all of the elements described relative to the computer 3402, although, for purposes of brevity, only a memory/storage device 3450 is illustrated. The logical connections depicted include wired/wireless connectivity to a local area network (LAN) 3452 and/or larger networks, e.g., a wide area network (WAN) 3454. Such LAN and WAN networking environments are commonplace in offices and companies, and facilitate enterprise-wide computer networks, such as intranets, all of which can connect to a global communications network, e.g., the Internet.

When used in a LAN networking environment, the computer 3402 can be connected to the local network 3452 through a wired and/or wireless communication network interface or adapter 3456. The adapter 3456 can facilitate wired or wireless communication to the LAN 3452, which can also include a wireless AP disposed thereon for communicating with the wireless adapter 3456.

When used in a WAN networking environment, the computer 3402 can include a modem 3458 or can be connected to a communications server on the WAN 3454 or has other means for establishing communications over the WAN 3454, such as by way of the Internet. The modem 3458, which can be internal or external and a wired or wireless device, can be connected to the system bus 3408 via the input device interface 3442. In a networked environment, program modules depicted relative to the computer 3402 or portions thereof, can be stored in the remote memory/storage device 3450. It will be appreciated that the network connections shown are example and other means of establishing a communications link between the computers can be used.

The computer 3402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

a wireless gateway device located within a tubular-shaped housing and comprising electrical connection elements for power and network connectivity; and an antenna positioned on a surface of and integrated with the housing and electrically coupled to the wireless gateway device, wherein the antenna comprises antenna elements embedded into the housing half wavelengths apart, forming a substantially uniform surface with the housing and providing a defined frequency along the housing, wherein the housing is adapted to be embedded within, integrated and uniform with a support structure exposed to a defined environment, wherein the housing is sized to accommodate the half wavelength spacing between the antenna elements, wherein the housing is configured to serve a first function and the support structure is configured to serve a second function, and wherein the first function is distinct from the second function.

2. The system of claim 1, wherein the wireless gateway device comprises circuitry that facilitates multiple-input and multiple-output communication of the antenna.

3. The system of claim 2, wherein the antenna comprises a resonant slot antenna array.

4. The system of claim 2, wherein the antenna comprises a horn antenna array.

5. The system of claim 2, wherein the antenna comprises a dipole antenna array.

6. The system of claim 2, wherein the antenna comprises a patch antenna array.

7. The system of claim 1, wherein the wireless gateway device is powered via power over Ethernet.

8. The system of claim 1, wherein the wireless gateway device comprises:

a transceiver; and an antenna launch point of antenna launch points, wherein the antenna launch point is electrically coupled to the transceiver and the antenna, wherein the antenna launch points are positioned such that a distance of approximately a length of a half wavelength is between at least two of the antenna launch points, and wherein the antenna launch point is a location from which a signal emanates from the antenna.

9. The system of claim 1, further comprising the support structure.

10. The system of claim 1, wherein the first function comprises encapsulation of the wireless gateway device and wherein the second function comprises physical support for an entity located within the defined environment.

11. A system, comprising:

wireless communication assembly apparatuses positioned relative to respective support structures in a defined environment, wherein the wireless communication assembly apparatuses comprise respective wireless gateway devices electrically coupled to antennas and located within tubular-shaped housings to which the antennas are coupled, wherein an antenna of the antennas comprises antenna elements embedded into a housing half wavelengths apart, forming a substantially uniform surface with the housing and providing a defined frequency along the housing, wherein the wireless communication assembly apparatuses are adapted to be positioned embedded within, integrated and uniform with a support structure in the defined environment, wherein the defined environment comprises a stadium, and wherein the wireless communication assembly apparatus is positioned within a first hand rail in a first section of the stadium.

12. The system of claim 11, wherein a first wireless communication assembly apparatus of the wireless communication assembly apparatuses is associated with a first channel and a second wireless communication assembly apparatus of the wireless communication assembly apparatuses is associated with a second channel.

13. The system of claim 12, wherein the second wireless communication assembly apparatus is positioned within a second hand rail in a second section of the stadium.

14. The system of claim 12, wherein the first wireless communication assembly apparatuses comprise directional horn antenna arrays.

15. The system of claim 1, wherein the defined spacing between the antenna elements is approximately 62.5 millimeters and the defined frequency is approximately 2.4 Gigahertz.

16. The system of claim 4, further comprising plastic antenna covers positioned over respective ones of the antenna elements, wherein the housing is formed in a tubular shape to accommodate the network connectivity.

17. The system of claim 5, further comprising plastic antenna covers positioned over respective ones of the antenna elements, wherein the housing is formed in a rectangular prism shape or cuboid shape to accommodate the network connectivity.

18. The system of claim 2, wherein the housing is embedded within a cavity of the support structure, and wherein the housing is a composite wall structure of the support structure.

19. A system, comprising:

a wireless gateway device located within a first tubular-shaped housing and comprising electrical connection elements for power and network connectivity;

an antenna positioned on a surface of and integrated with the first tubular-shaped housing and electrically coupled to the wireless gateway device; and a second housing encapsulating the first tubular-shaped housing, antenna and the wireless gateway device, wherein the second housing is adapted to be embedded within, integrated and uniform with a support structure exposed to a defined environment, wherein the antenna comprises antenna elements embedded into the housing half wavelengths apart, forming a substantially uniform surface with the housing and providing a defined frequency along the housing, and wherein the housing is sized to accommodate the half wavelength spacing between the antenna elements.

20. The system of claim 19, wherein the support structure comprises a trash can or a lamp post.

* * * * *